US011668572B2

(12) United States Patent
McEvoy et al.

(10) Patent No.: US 11,668,572 B2
(45) Date of Patent: Jun. 6, 2023

(54) SYSTEMS AND METHODS FOR GENERATING INDOOR PATHS

(71) Applicant: Johnson Controls Tyco IP Holdings LLP, Milwaukee, WI (US)

(72) Inventors: Joseph McEvoy, Cork (IE); Matthew Breed Myung-Sun Scott, Cork (IE); Michael Gerard Cronin, Crosshaven (IE)

(73) Assignee: JOHNSON CONTROLS TYCO IP HOLDINGS LLP, Milwaukee, WI (US)

( * ) Notice: Subject to any disclaimer, the term of this patent is extended or adjusted under 35 U.S.C. 154(b) by 0 days.

(21) Appl. No.: 17/189,871

(22) Filed: Mar. 2, 2021

(65) Prior Publication Data
US 2021/0278219 A1    Sep. 9, 2021

Related U.S. Application Data

(60) Provisional application No. 62/985,225, filed on Mar. 4, 2020.

(51) Int. Cl.
*G01C 21/20* (2006.01)
*G01C 21/00* (2006.01)
*H04W 4/80* (2018.01)
*H04W 4/029* (2018.01)

(52) U.S. Cl.
CPC ......... *G01C 21/206* (2013.01); *G01C 21/383* (2020.08); *G01C 21/3848* (2020.08); *H04W 4/029* (2018.02); *H04W 4/80* (2018.02)

(58) Field of Classification Search
CPC . G01C 21/206; G01C 21/383; G01C 21/3848
See application file for complete search history.

(56) References Cited

U.S. PATENT DOCUMENTS

| | | | |
|---|---|---|---|
| 8,825,388 B2 | 9/2014 | Khorashadi et al. | |
| 9,619,908 B1 | 4/2017 | Zuczek | |
| 10,352,707 B2* | 7/2019 | Kordari | G01C 21/383 |
| 2012/0044265 A1* | 2/2012 | Khorashadi | H04W 4/024 |
| | | | 345/641 |
| 2018/0245927 A1* | 8/2018 | Frish | G01S 19/49 |

OTHER PUBLICATIONS

Newman et al., "Generating Probabilistic Path Observation from GPS Data for Route Choice Modeling," Ecole Polytechnique Fédérale de Lausanne, Transport and Mobility Laboratory, 2009, 12 pages.

\* cited by examiner

*Primary Examiner* — Redhwan K Mawari
*Assistant Examiner* — Godfrey Aleksander Maciorowski
(74) *Attorney, Agent, or Firm* — Foley & Lardner LLP

(57) ABSTRACT

A method for generating paths in a building space, the method including retrieving, by a processing circuit, a heatmap for the building space, generating, by the processing circuit, a plurality of vectors, the vectors defined by a first grid location and a second grid location of a plurality of grid locations, determining, by the processing circuit, a subset of vectors from the plurality of vectors based on a proximity of the plurality of vectors to a selected vector in the plurality of vectors, and combining, by the processing circuit, the subset of vectors to generate a merge location, wherein the merge location is used to adjust at least one of the first grid location or second grid location of at least one vector in the subset of vectors.

20 Claims, 14 Drawing Sheets

SYSTEMS AND METHODS FOR GENERATING INDOOR PATHS

CROSS-REFERENCE TO RELATED PATENT APPLICATION

This application claims the benefit of, and priority to, U.S. Provisional Patent Application No. 62/985,225 filed Mar. 4, 2020, the entirety of which is incorporated by reference herein.

BACKGROUND

The present disclosure relates generally to indoor building systems, and more specifically, tracking occupants through building spaces.

Occupant tracking systems enable building systems to better understand the behavior and movement of occupants through a building, as well as provide navigation instructions to an individual to quickly find a space, person, or asset located within the building. Occupants can be tracked as they navigate through hallways, rooms, stairwells, and other building spaces of the building.

Several wireless communication systems exist to track an occupant through a building, such as Bluetooth, WiFi, and GPS systems. However, such systems can produce measurements that vary as much as two to three meters from an actual location of an occupant. Measurement error in tracking systems can be particularly problematic in indoor applications, where distinct spaces are in relatively close proximity to each other.

SUMMARY

One implementation of the present disclosure is a method for generating paths in a building space. The method includes retrieving, by a processing circuit, a heatmap for the building space, the heatmap comprising a plurality of grid locations, wherein the plurality of grid locations comprise occupant density data of a location in the building space corresponding to the plurality of grid locations. The method further includes generating, by the processing circuit, a plurality of vectors, the plurality of vectors defined by a first grid location and a second grid location of the plurality of grid locations, wherein generating the plurality of vectors comprises comparing occupant density data for the first grid location to occupant density data for the second grid location, determining, by the processing circuit, a subset of vectors from the plurality of vectors based on a proximity of the plurality of vectors to a selected vector in the plurality of vectors, and combining, by the processing circuit, the subset of vectors to generate a merge location, wherein the merge location is used to adjust at least one of the first grid location or the second grid location of at least one vector in the subset of vectors.

In some embodiments, a distance between the first grid location and the second grid location for vectors in the plurality of vectors is within a threshold value.

In some embodiments, generating, by the processing circuit, the plurality of vectors comprises comparing at least one of timestamp data, occupant identity data, or a calculated proximity between the first grid location and the second grid location to generate vectors in the plurality of vectors.

In some embodiments, the method further includes removing a vector from the plurality of vectors based on the proximity of the vector to the plurality of vectors or based on the occupant density data of the first grid location or the second grid location of the vector being less than a threshold value.

In some embodiments, the merge location is an average grid location of the first grid location or the second grid location of two or more vectors in the subset of vectors.

In some embodiments, the method further includes adjusting, by the processing circuit, the first grid location or the second grid location of the at least one vector in the subset of vectors to the merge location.

In some embodiments, the method includes determining, by the processing circuit, the subset of vectors is based on a comparison of at least one of the first grid location or the second grid location of the selected vector to at least one of the first grid location or the second grid location of vectors in the plurality of vectors.

In some embodiments, the method includes determining, by the processing circuit, the subset of vectors further comprises including a vector of the plurality of vectors in the subset of vectors responsive to a calculated distance between at least one of the first grid location or the second grid location of the vector and one of the first grid location or the second grid location of the selected vector being less than a threshold value.

In some embodiments, the method includes generating, by the processing circuit, vectors in the plurality of vectors further includes selecting, from the plurality of grid locations, the first grid location for a vector, comparing the occupant density data of the first grid location to occupant density data of a subset of grid locations within a threshold distance of the first grid location, and selecting the second grid location from the subset of grid locations based on the comparing of the occupant density data of the first grid location to the occupant density data of the second grid location.

In some embodiments, the second grid location of a first generated vector is selected as the first grid location of a second generated vector responsive to the first generated vector failing to meet a criteria to terminate a vector path.

In some embodiments, the criteria to terminate the vector path is based on the second grid location of the first generated vector being an edge grid location of the heatmap.

Another implementation of the present disclosure is a building system of a building including one or more memory devices storing instructions thereon that, when executed by one or more processors, cause the one or more processors to retrieve a heatmap for a building space, the heatmap comprising a plurality of grid locations, wherein the plurality of grid locations comprise occupant density data of a location in the building space corresponding to the plurality of grid locations. The instructions cause the one or more processors to generate a plurality of vectors, the plurality of vectors defined by a first grid location and a second grid location of the plurality of grid locations, wherein generating the plurality of vectors comprises comparing occupant density data for the first grid location to occupant density data for the second grid location, determine a subset of vectors from the plurality of vectors based on a proximity of the plurality of vectors to a selected vector in the plurality of vectors, and combine the subset of vectors to generate a merge location, wherein the merge location is used to adjust at least one of the first grid location or the second grid location of at least one vector in the subset of vectors.

In some embodiments, a distance between the first grid location and the second grid location for vectors in the plurality of vectors is within a threshold value.

In some embodiments, the instructions cause the one or more processors to generate the plurality of vectors comprises comparing at least one of timestamp data, occupant identity data, or a calculated proximity between the first grid location and the second grid location to generate vectors in the plurality of vectors.

In some embodiments, the instructions cause the one or more processors to remove a vector from the plurality of vectors based on the proximity of the vector to the plurality of vectors or based on the occupant density data of the first grid location or the second grid location of the vector being less than a threshold value.

In some embodiments, the instructions cause the one or more processors to determine the subset of vectors is based on a comparison of at least one of the first grid location or the second grid location of the selected vector to at least one of the first grid location or the second grid location of vectors in the plurality of vectors.

In some embodiments, the instructions cause the one or more processors to generate vectors in the plurality of vectors further by selecting, from the plurality of grid locations, the first grid location for a vector, comparing the occupant density data of the first grid location to occupant density data of a subset of grid locations within a threshold distance of the first grid location, and selecting the second grid location from the subset of grid locations based on the comparing of the occupant density data of the first grid location to the occupant density data of the second grid location.

In some embodiments, the merge location is an average grid location of the first grid location or the second grid location of two or more vectors in the subset of vectors.

In some embodiments, the instructions cause the one or more processors to adjust the first grid location or the second grid location of the at least one vector in the subset of vectors to the merge location.

Another implementation of the present disclosure is one or more memory devices storing instructions thereon that, when executed by one or more processors, cause the one or more processors to retrieve a heatmap for a building space, the heatmap comprising a plurality of grid locations, wherein the plurality of grid locations comprise occupant density data of a location in the building space corresponding to the plurality of grid locations, generate a plurality of vectors, the plurality of vectors defined by a first grid location and a second grid location of the plurality of grid locations, wherein generating the plurality of vectors comprises comparing occupant density data for the first grid location to occupant density data for the second grid location, determine a subset of vectors from the plurality of vectors based on a proximity of the plurality of vectors to a selected vector in the plurality of vectors, and combine the subset of vectors to generate a merge location, wherein the merge location is used to adjust at least one of the first grid location or the second grid location of at least one vector in the subset of vectors.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

DETAILED DESCRIPTION

Overview

Figure 1:
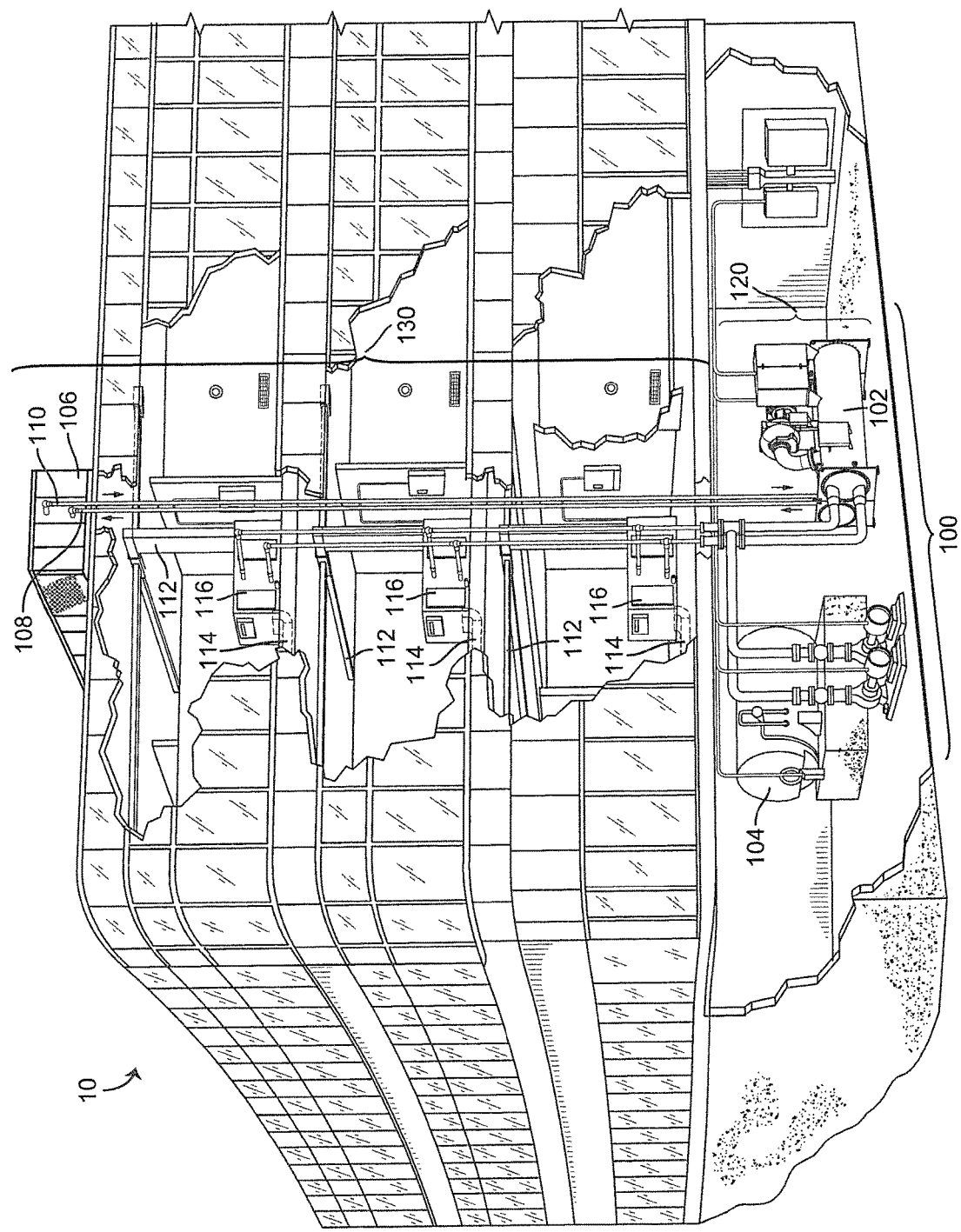
FIG. 1 is a drawing of a building equipped with a heating, ventilation, or air conditioning (HVAC) system, according to some embodiments.

Before turning to the figures which illustrate several embodiments in detail, it should be understood that the application may not be limited to the details or methodology set forth in the description or illustrated in the figures. It should be understood that the terminology may be for the purpose of description only, and should not be regarded as limiting.

Referring to the figures generally, indoor path building systems and methods are disclosed with advantageous features, configurations, and function. The disclosure provides a solution to improve occupant tracking and navigation through a building space by generating fixed paths through the building from occupant location data.

It can be advantageous to track a location of an occupant within a building space; however, common occupant tracking systems, such as Bluetooth, WiFi, ultra-wideband (UWB), and global positioning systems (GPS) can suffer from poor location accuracy; in some cases, these systems produce error on the magnitude of several feet or yards. A pre-defined route can be defined based on common or dedicated routes in the building (e.g., hallways, stairwells, doorways, etc.). Thereafter, location measurements from a tracking system can be automatically adjusted to the nearest point on the pre-defined path so as to reduce measurement error.

Creating and maintaining these paths in indoor spaces can be very time consuming and can present additional complications. For example, a floor plan of a building may not be available to a tracking system. Additionally, doorways, pathways, and spaces may be underutilized by or undesirable to occupants of the building. There may exist non-structural objects (e.g., chairs, desks, tables, etc.) that are undocumented in a floor plan of a building yet obstruct potential pathways through the space. Indoor spaces can change their internal layout often and without notice. In buildings with restricted work areas, certain pathways through the building may not be available to all occupants and thus require additional analysis to identify which paths an occupant may take.

The present disclosure provides a solution to these challenges by implementing systems and methods for generating indoor paths in a building space based on real occupant data, without the need for a floor plan of a building or manually-defined paths. Occupant coordinate data can be collected over a period of time and converted into a heatmap of the building space. A plurality of vectors can be generated within the heatmap linking vector paths through the building space based on the data within the heatmap. The vector paths can then be refined to remove outliers, combine similar or neighboring vectors, and create a network of continuous paths through the building space. These paths can then be used to provide navigate directions to occupants to find a person, asset, or space in a building, reduce measurement error in estimated occupant location, and better understand occupant behavior within the building.

The present disclosure provides distinct advantage over systems and methods in the art in that paths in a building can be constructed based on actual occupant trends, more accurately track occupant locations, automatically account for non-structural obstacles, and more effectively adjust to varying or changing spaces. Additionally, generated paths can be stored and used for subsequent location tracking and navigation with reduced computation time and complexity compared to traditional occupant tracking systems. The present disclosure offers a robust method that can be applied to any space to generate paths within the space. The present disclosure can further identify paths based on other factors, such as personnel identity, time of day, day of the week, month of the year, and many other factors.

Building HVAC Systems and Building Management Systems

Figure 2:
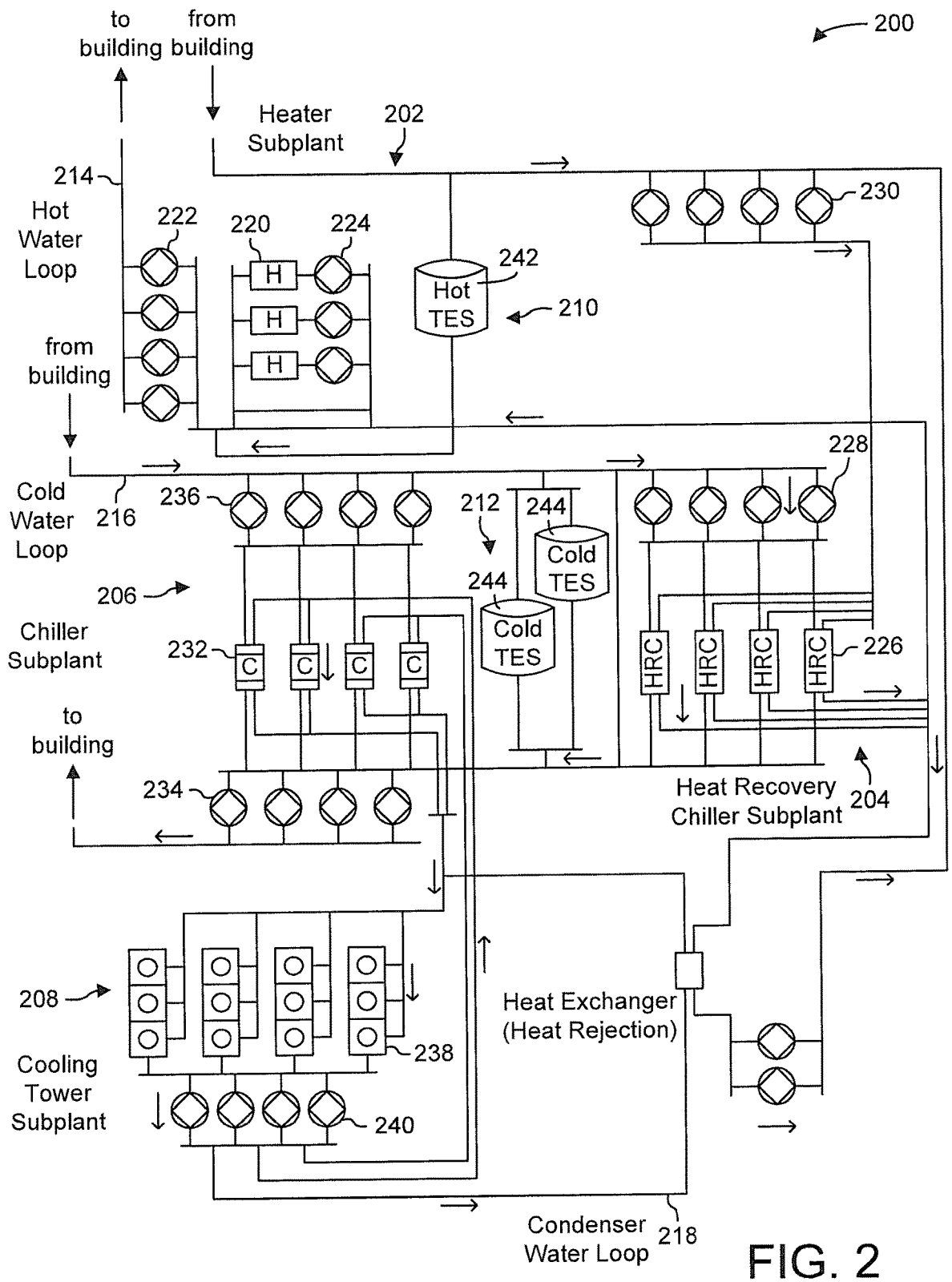
FIG. 2 is a drawing of a waterside system which can be used in combination with the HVAC system of FIG. 1, according to some embodiments.
Figure 3:
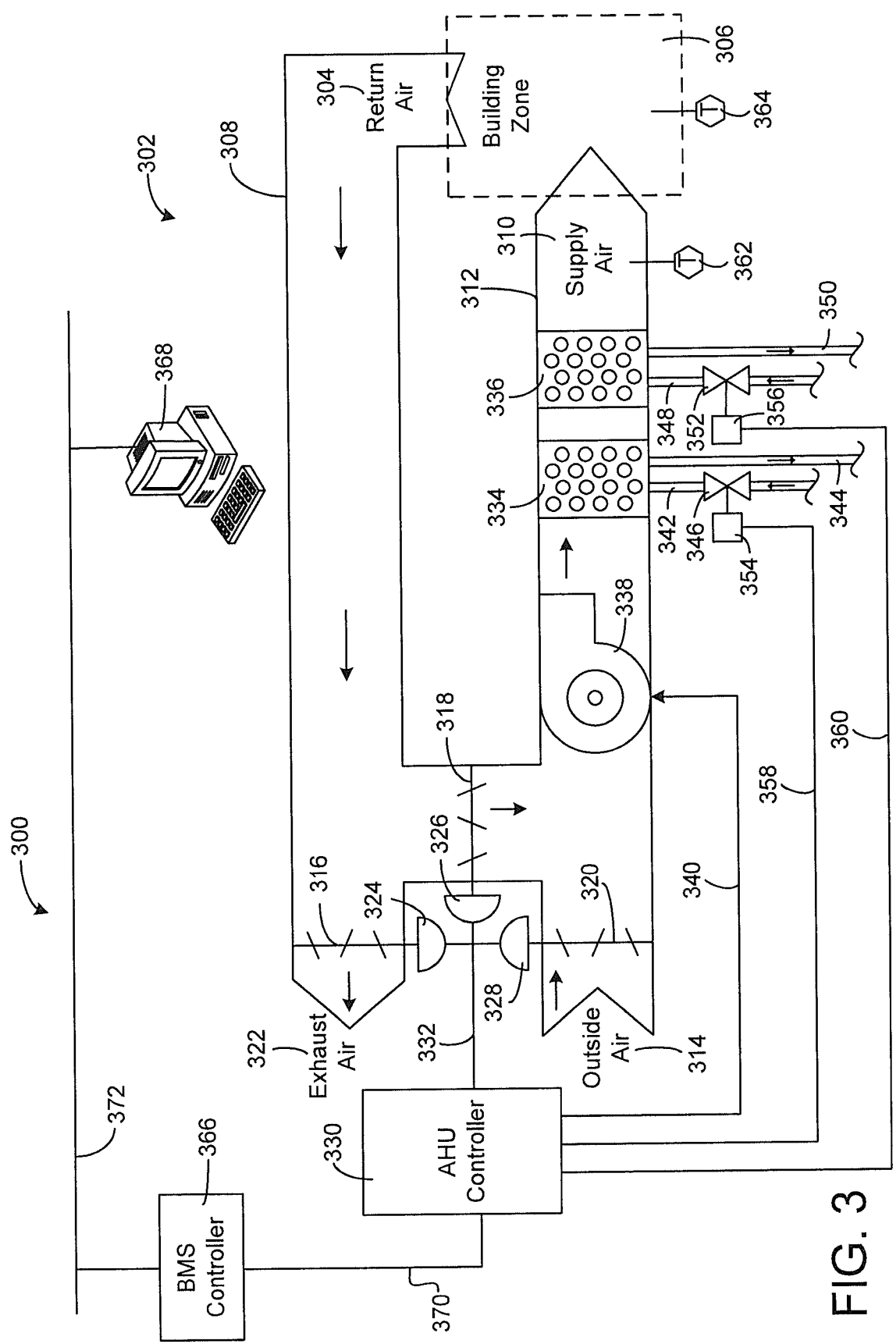
FIG. 3 is a drawing of an airside system which can be used in combination with the HVAC system of FIG. 1, according to some embodiments.
Figure 4:
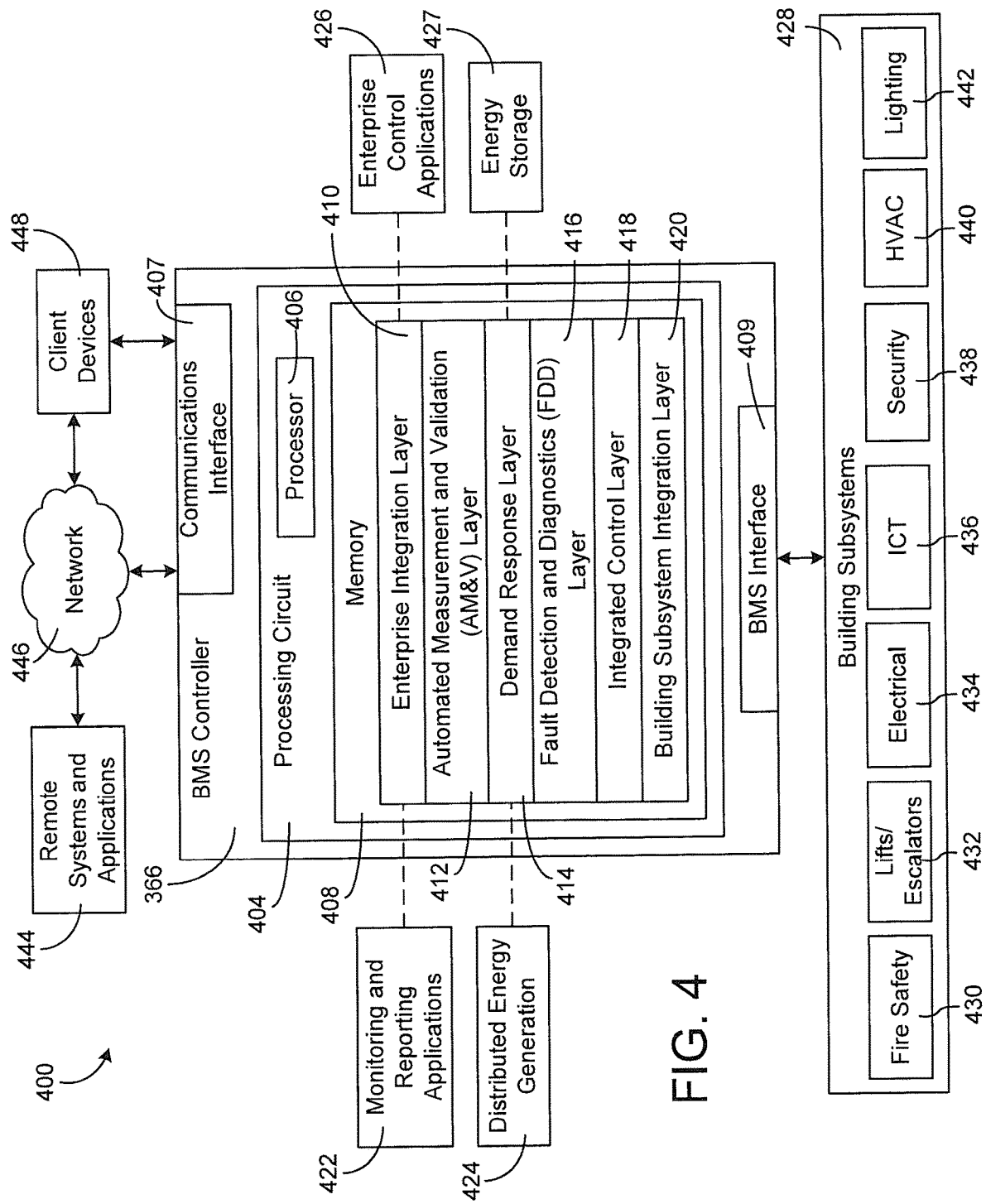
FIG. 4 is a block diagram of a building management system which can be used to monitor and control the building and HVAC system of FIG. 1, according to some embodiments.

Referring now to FIGS. 1-4, several building management systems (BMS) and HVAC systems in which the systems and methods of the present disclosure can be implemented are shown, according to some embodiments. In brief overview, FIG. 1 shows a building 10 equipped with a HVAC system 100. FIG. 2 is a block diagram of a waterside system 200 which can be used to serve building 10. FIG. 3 is a block diagram of an airside system 300 which can be used to serve building 10. FIG. 4 is a block diagram of a BMS which can be used to monitor and control building 10.

Building and HVAC System

Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 includes a HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

In some embodiments, HVAC system 100 uses free cooling to cool the working fluid. For example, HVAC system 100 can include one or more cooling towers or heat exchangers which transfer heat from the working fluid to outside air. Free cooling can be used as an alternative or supplement to mechanical cooling via chiller 102 when the temperature of the outside air is below a threshold temperature. HVAC system 100 can switch between free cooling and mechanical cooling based on the current temperature of the outside air and/or the predicted future temperature of the outside air.

AHU 106 may place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 may transfer heat between the airflow and the working fluid to provide heating or cooling for the airflow. For example, AHU 106 can include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

Waterside System

Referring now to FIG. 2, a block diagram of a waterside system 200 is shown, according to some embodiments. In various embodiments, waterside system 200 may supplement or replace waterside system 120 in HVAC system 100 or can be implemented separate from HVAC system 100. When implemented in HVAC system 100, waterside system 200 can include a subset of the HVAC devices in HVAC system 100 (e.g., boiler 104, chiller 102, pumps, valves, etc.) and may operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 building 10. Heat recovery chiller subplant 204 can be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. Hot TES subplant 210 and cold TES subplant 212 may store hot and cold thermal energy, respectively, for subsequent use.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, CO2, etc.) can be used in place of or in addition to water to serve thermal energy loads. In other embodiments, subplants 202-212 may provide heating and/or cooling directly to the building or campus without requiring an intermediate heat transfer fluid. These and other variations to waterside system 200 are within the teachings of the present disclosure.

Each of subplants 202-212 can include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

In some embodiments, waterside system 200 uses free cooling to cool the water in cold water loop 216. For example, the water returning from the building in cold water loop 216 can be delivered to cooling tower subplant 208 and through cooling towers 238. Cooling towers 238 can remove heat from the water in cold water loop 216 (e.g., by transferring the heat to outside air) to provide free cooling for the water in cold water loop 216. In some embodiments, waterside system 200 switches between free cooling with cooling tower subplant 208 and mechanical cooling with chiller subplant 208 based on the current temperature of the outside air and/or the predicted future temperature of the outside air.

Hot TES subplant 210 is shown to include a hot TES tank 242 configured to store the hot water for later use. Hot TES subplant 210 may also include one or more pumps or valves configured to control the flow rate of the hot water into or out of hot TES tank 242. Cold TES subplant 212 is shown to include cold TES tanks 244 configured to store the cold water for later use. Cold TES subplant 212 may also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 can include more, fewer, or different types of devices and/or subplants based on the particular configuration of waterside system 200 and the types of loads served by waterside system 200.

Airside System

Referring now to FIG. 3, a block diagram of an airside system 300 is shown, according to some embodiments. In various embodiments, airside system 300 may supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, ducts 112-114, fans, dampers, etc.) and can be located in or around building 10. Airside system 300 may operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 may receive return air 304 from building zone 306 via return air duct 308 and may deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 may communicate with an AHU controller 330 via a communications link 332. Actuators 324-328 may receive control signals from AHU controller 330 and may provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 may communicate with fan 338 via communications link 340 to control a flow rate of supply air 310. In some embodiments, AHU controller 330 controls an amount of heating or cooling applied to supply air 310 by modulating a speed of fan 338.

Cooling coil 334 may receive a chilled fluid from waterside system 200 (e.g., from cold water loop 216) via piping 342 and may return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 may receive a heated fluid from waterside system 200 (e.g., from hot water loop 214) via piping 348 and may return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 may communicate with AHU controller 330 via communications links 358-360. Actuators 354-356 may receive control signals from AHU controller 330 and may provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 may also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU 330 may control the temperature of supply air 310 and/or building zone 306 by activating or deactivating coils 334-336, adjusting a speed of fan 338, or a combination of both.

In some embodiments, AHU controller 330 uses free cooling to cool supply air 310. AHU controller 330 can switch between free cooling and mechanical cooling by operating outside air damper 320 and cooling coil 334. For example, AHU controller 330 can deactivate cooling coil 334 and open outside air damper 320 to allow outside air 314 to enter supply air duct 312 in response to a determination that free cooling is economically optimal. AHU controller 330 can determine whether free cooling is economically optimal based on the temperature of outside air 314 and/or the predicted future temperature of outside air 314. For example, AHU controller 330 can determine whether the temperature of outside air 314 is predicted to be below a threshold temperature for a predetermined amount of time.

Still referring to FIG. 3, airside system 300 is shown to include a building management system (BMS) controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 may communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 may provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 may communicate with BMS controller 366 and/or AHU controller 330 via communications link 372.

Building Management Systems

Referring now to FIG. 4, a block diagram of a building management system (BMS) 400 is shown, according to some embodiments. BMS 400 can be implemented in building 10 to automatically monitor and control various building functions. BMS 400 is shown to include BMS controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 may also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3.

Each of building subsystems 428 can include any number of devices, controllers, and connections for completing its individual functions and control activities. HVAC subsystem 440 can include many of the same components as HVAC system 100, as described with reference to FIGS. 1-3. For example, HVAC subsystem 440 can include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 can include any number of light fixtures, ballasts, lighting sensors, dimmers, or other devices configured to controllably adjust the amount of light provided to a building space. Security subsystem 438 can include occupancy sensors, video surveillance cameras, digital video recorders, video processing servers, intrusion detection devices, access control devices and servers, or other security-related devices.

Still referring to FIG. 4, BMS controller 366 is shown to include a communications interface 407 and a BMS interface 409. Interface 407 may facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Interface 407 may also facilitate communications between BMS controller 366 and client devices 448. BMS interface 409 may facilitate communications between BMS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 can be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a Wi-Fi transceiver for communicating via a wireless communications network. In another example, one or both of interfaces 407, 409 can include cellular or mobile phone communications transceivers. In one embodiment, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 can be communicably connected to BMS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 408 can be or include volatile memory or non-volatile memory. Memory 408 can include database components, object code components, script components, or any other type of information structure for supporting the various activities and information structures described in the present application. According to some embodiments, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments BMS controller 366 can be distributed across multiple servers or computers (e.g., that can exist in distributed locations). Further, while FIG. 4 shows applications 422 and 426 as existing outside of BMS controller 366, in some embodiments, applications 422 and 426 can be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 can be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 can be configured to serve clients or local applications with information and services to support a variety of enterprise-level applications. For example, enterprise control applications 426 can be configured to provide subsystem-spanning control to a graphical user interface (GUI) or to any number of enterprise-level business applications (e.g., accounting systems, user identification systems, etc.). Enterprise control applications 426 may also or alternatively be configured to provide configuration GUIs for configuring BMS controller 366. In yet other embodiments, enterprise control applications 426 can work with layers 410-420 to optimize building performance (e.g., efficiency, energy use, comfort, or safety) based on inputs received at interface 407 and/or BMS interface 409.

Building subsystem integration layer 420 can be configured to manage communications between BMS controller 366 and building subsystems 428. For example, building subsystem integration layer 420 may receive sensor data and input signals from building subsystems 428 and provide output data and control signals to building subsystems 428. Building subsystem integration layer 420 may also be configured to manage communications between building subsystems 428. Building subsystem integration layer 420 translate communications (e.g., sensor data, input signals, output signals, etc.) across a plurality of multi-vendor/multi-protocol systems.

Demand response layer 414 can be configured to optimize resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 may receive inputs from other layers of BMS controller 366 (e.g., building subsystem integration layer 420, integrated control layer 418, etc.). The inputs received from other layers can include environmental or sensor inputs such as temperature, carbon dioxide levels, relative humidity levels, air quality sensor outputs, occupancy sensor outputs, room schedules, and the like. The inputs may also include inputs such as electrical use (e.g., expressed in kWh), thermal load measurements, pricing information, projected pricing, smoothed pricing, curtailment signals from utilities, and the like.

According to some embodiments, demand response layer 414 includes control logic for responding to the data and signals it receives. These responses can include communicating with the control processes in integrated control layer 418, changing control strategies, changing setpoints, or activating/deactivating building equipment or subsystems in a controlled manner. Demand response layer 414 may also include control logic configured to determine when to utilize stored energy. For example, demand response layer 414 may determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models can include, for example, thermodynamic models describing the inputs, outputs, and/or functions performed by various sets of building equipment. Equipment models may represent collections of building equipment (e.g., subplants, chiller arrays, etc.) or individual devices (e.g., individual chillers, heaters, pumps, etc.).

Demand response layer 414 may further include or draw upon one or more demand response policy definitions (e.g., databases, XML files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 can be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated supersystem. In some embodiments, integrated control layer 418 includes control logic that uses inputs and outputs from a plurality of building subsystems to provide greater comfort and energy savings relative to the comfort and energy savings that separate subsystems could provide alone. For example, integrated control layer 418 can be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 can be configured to enhance the effectiveness of demand response layer 414 by enabling building subsystems 428 and their respective control loops to be controlled in coordination with demand response layer 414. This configuration may advantageously reduce disruptive demand response behavior relative to conventional systems. For example, integrated control layer 418 can be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 can be configured to provide feedback to demand response layer 414 so that demand response layer 414 checks that constraints (e.g., temperature, lighting levels, etc.) are properly maintained even while demanded load shedding is in progress. The constraints may also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 can be configured to provide calculated inputs (e.g., aggregations) to these higher levels based on outputs from more than one building subsystem.

Automated measurement and validation (AM&V) layer 412 can be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 can be based on building system energy models and/or equipment models for individual BMS devices or subsystems. For example, AM&V layer 412 may compare a model-predicted output with an actual output from building subsystems 428 to determine an accuracy of the model.

Fault detection and diagnostics (FDD) layer 416 can be configured to provide on-going fault detection for building subsystems 428, building subsystem devices (i.e., building equipment), and control algorithms used by demand response layer 414 and integrated control layer 418. FDD layer 416 may receive data inputs from integrated control layer 418, directly from one or more building subsystems or devices, or from another data source. FDD layer 416 may automatically diagnose and respond to detected faults. The responses to detected or diagnosed faults can include providing an alert message to a user, a maintenance scheduling system, or a control algorithm configured to attempt to repair the fault or to work-around the fault.

FDD layer 416 can be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to some embodiments, FDD layer 416 (or a policy executed by an integrated control engine or business rules engine) may shut-down systems or direct control activities around faulty devices or systems to reduce energy waste, extend equipment life, or assure proper control response.

FDD layer 416 can be configured to store or access a variety of different system data stores (or data points for live data). FDD layer 416 may use some content of the data stores to identify faults at the equipment level (e.g., specific chiller, specific AHU, specific terminal unit, etc.) and other content to identify faults at component or subsystem levels. For example, building subsystems 428 may generate temporal (i.e., time-series) data indicating the performance of BMS 400 and the various components thereof. The data generated by building subsystems 428 can include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alert a user to repair the fault before it becomes more severe.

Indoor Path Building Systems and Methods

Figure 5:
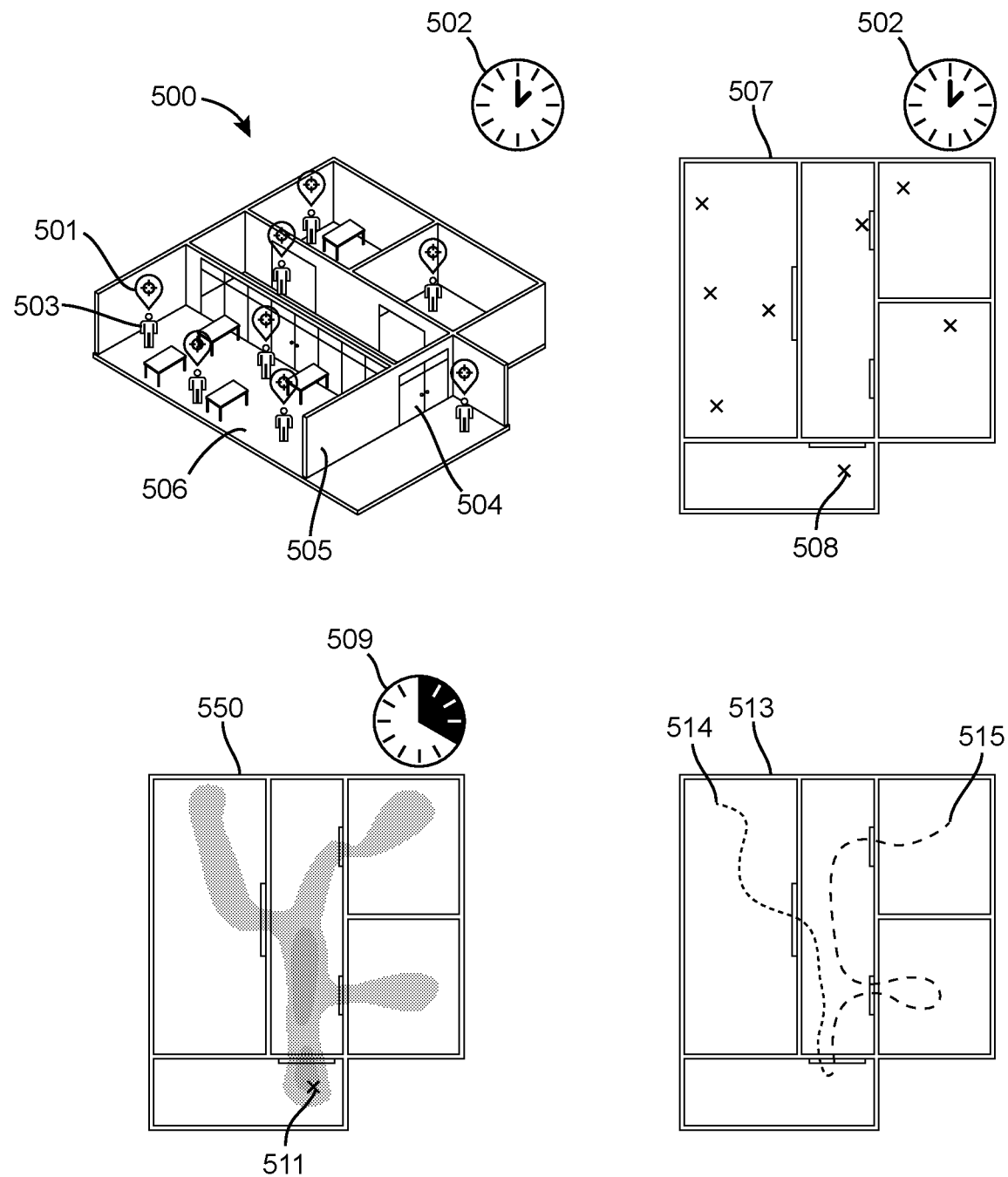
FIG. 5 is a depiction of occupants within a building space and associated location data, according to some embodiments.

Referring now to FIG. 5, several features of occupant tracking are shown. Building 500 depicts several aspects of tracking occupants in a building. Building 500 can include permanent obstructions 505 (e.g., walls), transient or role-based obstructions 504, (e.g., doorways), and non-structural or temporary obstructions 506 (e.g., furniture). Occupants 503 may reside in or move between various spaces within building 500. Devices within building 500 or carried by occupants 503 may communicate with a building system to identify the location 501 of occupant 503 within the building.

A building floor plan 507 depicts data collection by a building system of occupant locations. Data points 508 depict identified locations of occupants at time 502. A building system may not have access to the actual floor plan of building 500, but rather maps occupant locations 508 to a grid location in a coordinate grid. The building system may be configured to measure the location of the same occupants multiple times. In some embodiments, the building system may be configured to measure the location of every known or available occupant according to a regular frequency. In some embodiments, the building system is configured to store an location of an occupant when received from an occupant tracking subsystem.

A heatmap 550 is shown that can be generated for building 500. Heatmap 550 can be generated by using occupant location data over a time period 509. Time period 509 may be based on how frequently occupant locations are determined. Time period 509 may be based on a minimum number of data points before generating the heatmap 550, in some embodiments. Heatmap 550 may be configured as a coordinate grid, and may be continuous or discrete. Each coordinate location of heatmap 550 may store data corresponding to how frequently one or more occupants were measured at that location. In some embodiments, heatmap 550 is represented with colored or gray-scaled intensities 511 that represent how much time one or more occupants spent at a given location. In some embodiments, the coordinate grid of heatmap 550 is different than a coordinate grid used to identify the location of occupants, such that occupant coordinate data is mapped to the nearest coordinate location in heatmap 550.

A floor plan 513 of building 500 is shown with paths 514 and 515 through the various building spaces. It is generally desirable to understand the paths that occupants take through a building; however, identifying and tracking every path taken by individual occupants, such as paths 514 and 515, can be computationally expensive and inaccurate. There exists a need to more accurately measure an occupant's movement through a building space. Embodiments contemplated by the present disclosure identify that pre-determined paths through the building space provide a solution to this problem in that a measured location may be compared to the pre-determined paths to estimate the actual location of an occupant. The methods and systems herein describe means to generate the pre-determined paths using gathered occupant location data, without awareness of the building layout or user input.

Figure 6:
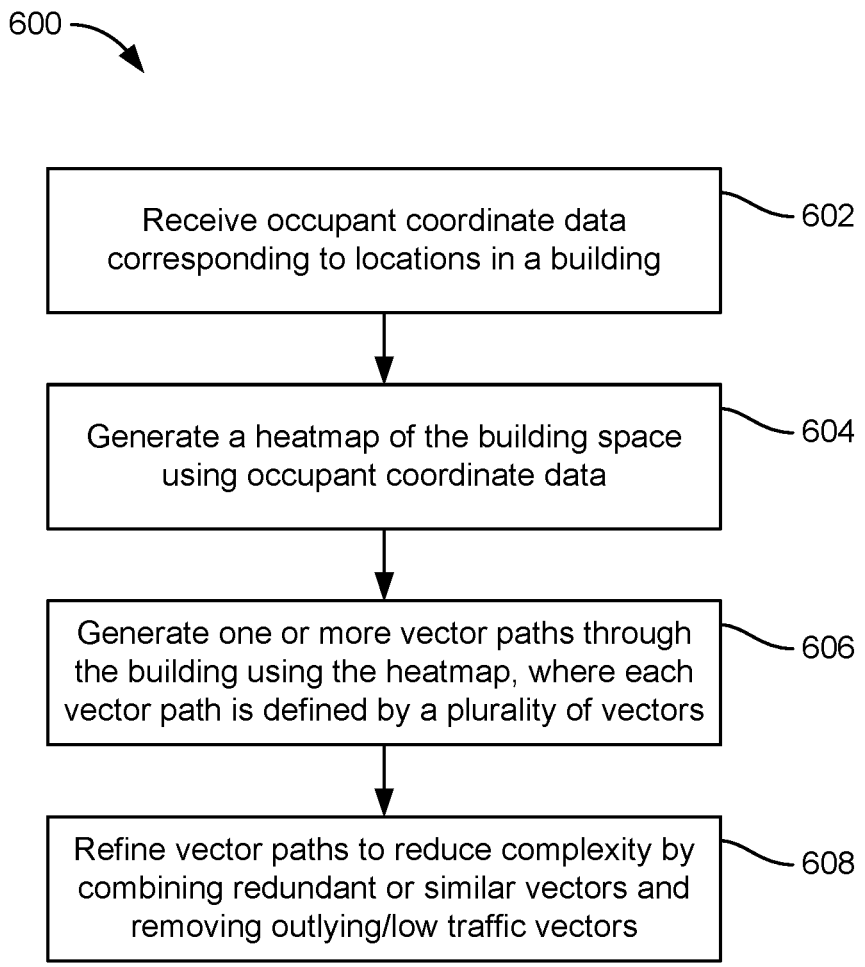
FIG. 6 is flow diagram of a method to generate occupant paths through a building, according to some embodiments.

Referring now to FIG. 6, a flow diagram 600 of a method for generating paths through a building using occupant location data is shown. In some embodiments, the functions of flow diagram 600 can be performed by a computing device communicably connected to, or integrated within, a building system, such as a BMS. The method includes receiving occupant coordinate data at 602. The occupant coordinate data generally corresponds to locations in a building. The occupant coordinate data may be received as GPS coordinates, relative coordinates to infrastructure within the building, or any other coordinate system such that the location of the occupant can be determined. A plurality of occupant coordinate data may be received or collected over a given time period.

At 604, a heatmap of the building space is generated using the occupant coordinate data. In some embodiments, the heatmap comprises a coordinate grid, wherein each grid location contains data corresponding to occupant coordinate data. In some embodiments, the data contained in each grid location is occupant density data. In some embodiments, the data contained in each grid location contains timeseries data. A heatmap may generally define boundaries of the building space. In some embodiments, the heatmap may use data associated with a floorplan of a building to determine boundaries. Alternatively, in some embodiments, the heatmap is received from storage or another computing device. The received heatmap can be the same as, or include any characteristic of, the generated heatmap as discussed herein. In some embodiments, one or more heatmaps may be combined into a single heatmap. Heatmap generation will be discussed in more detail in regard to FIG. 8.

At 606, one or more vector paths through the building are generated using the heatmap of the building. In some embodiments, the vector paths are generated using a plurality of vectors. A vector may be defined by two grid locations (used interchangeably with coordinate points). The vectors and vector paths may be defined within a coordinate grid, such as the heatmap coordinate grid or a different coordinate grid. A vector path may be generated by iteratively defining vectors in a series, such that each vector shares a coordinate point with each of the previous and subsequent vectors in the series. The vectors in the series may be defined based on a comparison of data in neighboring grid locations of the heatmap. Some vector paths may cross each other, and some may overlap either in part or whole. In some embodiments, the vectors in the plurality of vectors, or the vector paths themselves, are directional vectors or vector paths (i.e., the vector or vector path comprises a defined starting position and end position). In some embodiments, the vectors in the plurality of vectors or the vector paths themselves are bidirectional (i.e., have no explicit direction). The vector paths may be stored as a list of vectors in the plurality of vectors. Vector path generation will be discussed in further detail in regard to FIG. 9-11.

At 608, the one or more vector paths are refined to reduce the complexity of the vector paths. Vector refinement generally simplifies the generated vector paths into the most likely pathways taken by occupants in the building. In some embodiments, at least one grid location of two or more vectors of the plurality of vectors are combined into a single grid location. For example, multiple vectors with endpoints in proximity to each other may be identified and adjusted such that the multiple vectors share a single, common endpoint. In some embodiments, multiple vectors are combined to form a single replacement vector. Outlying or insignificant vectors may be identified and removed from the vector paths. Redundant or duplicate vectors may also be removed from the list of vectors. Vector refinement will be discussed in further detail in regard to FIG. 12-13.

The refined vector paths can be used for a variety of applications. For example, occupant coordinate data received subsequent to the generation and refinement of the vector paths can be adjusted such that the measured location of the occupant is changed to the nearest point on one of the vector paths. In another example, the built vector paths can be used to understand the actual movement of occupants through a building. Flow diagram 600 may be repeated when new occupant coordinate data is received, such that the vector paths through the building space can be updated or replaced as movement trends and path obstacles change over time.

Figure 7:
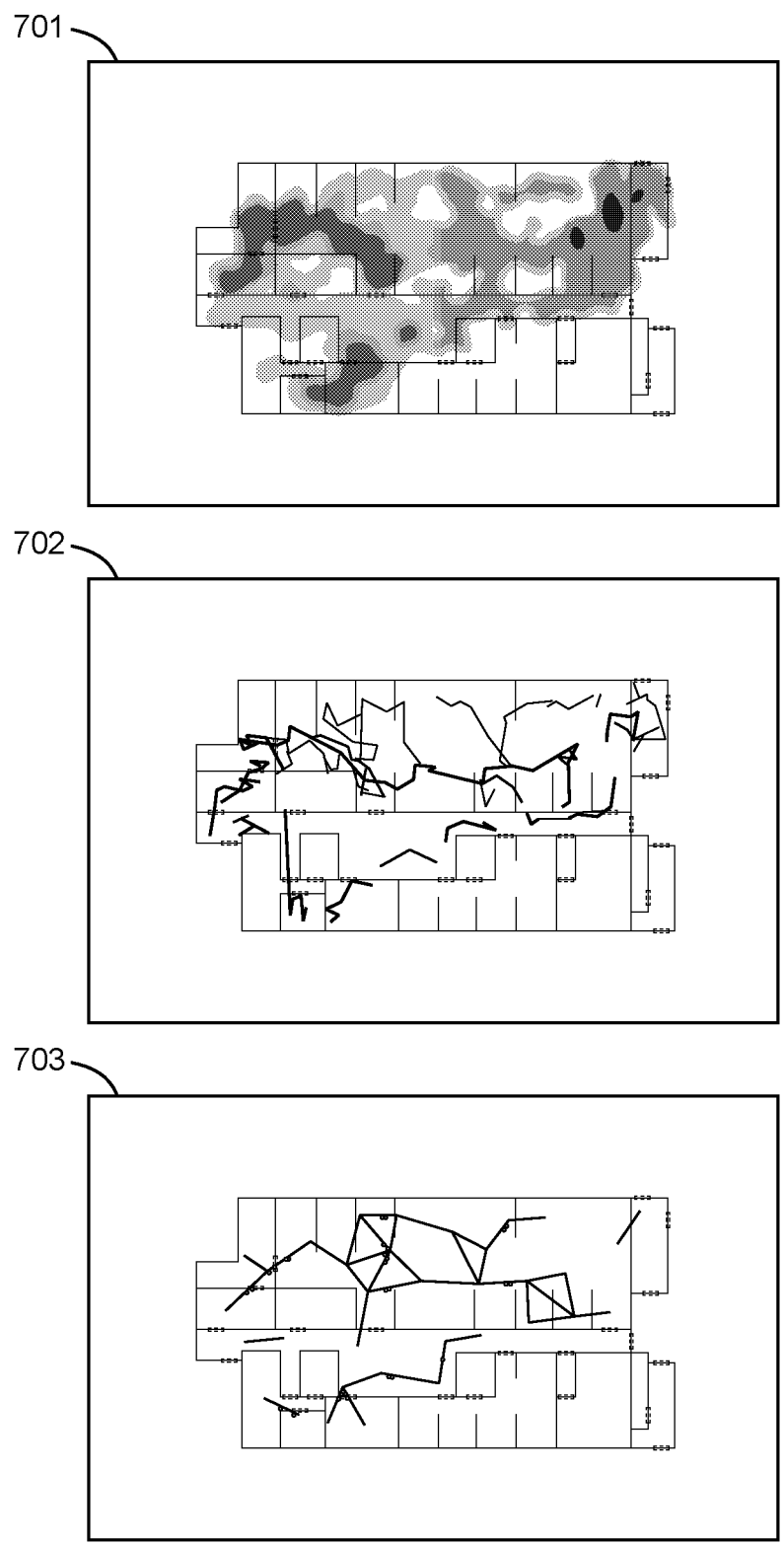
FIG. 7 is a depiction of various steps for generating vector paths from a heatmap, according to some embodiments.

Referring to FIG. 7, depictions of the various steps in building indoor paths are shown, according to an illustrative example. Shown in 701 is an example heat map generated for a building space. The heatmap in 701 represents occupant density data according to a color scheme. Areas colored red indicate relatively large amount of location data corresponding to said area of the building. Areas colored green indicate relatively small amount of location data measured that corresponds to said area of the building. In this illustration, the heatmap is overlaid on top of a two-dimensional floor plan of the building space; however, in some embodiments, the computing system may not have access to or otherwise consider data corresponding to a building floor plan.

Shown in 702 are generated vector paths through the building space based on the data in the heatmap 701. In some embodiments, the vector paths can overlap with or cross over one another. The vector paths may be generated such that no vector is disconnected from another vector. Vector paths may generally define a start condition (e.g., point in the heatmap with a maximum value) and a stop condition (e.g., a vector that terminates at a known wall or boundary of the heatmap). A vector with a relatively few amount of neighboring vectors (i.e., a number of vectors less than a threshold value) may be defined as an outlying or fringe vector.

Shown in 703 is the result of vector refinement of the generated vector paths. The vector paths shown in 703 are generally simpler in complexity than those of 702. Reduced complexity may include any of fewer total vectors or fewer vector paths, fewer vectors in close proximity to each other, or fewer outlying vectors in the vector paths. In some embodiments, the refined vector paths may be stored in memory for later use. The vector paths of 703 can be used by an occupant tracking system to estimate occupant locations and analyze occupant movement through the building space. In some embodiments, the vector paths generated after vector refinement can be further refined by a user via a user interface. The vectors may also be further refined once additional occupant location data is collected and considered.

Figure 8:
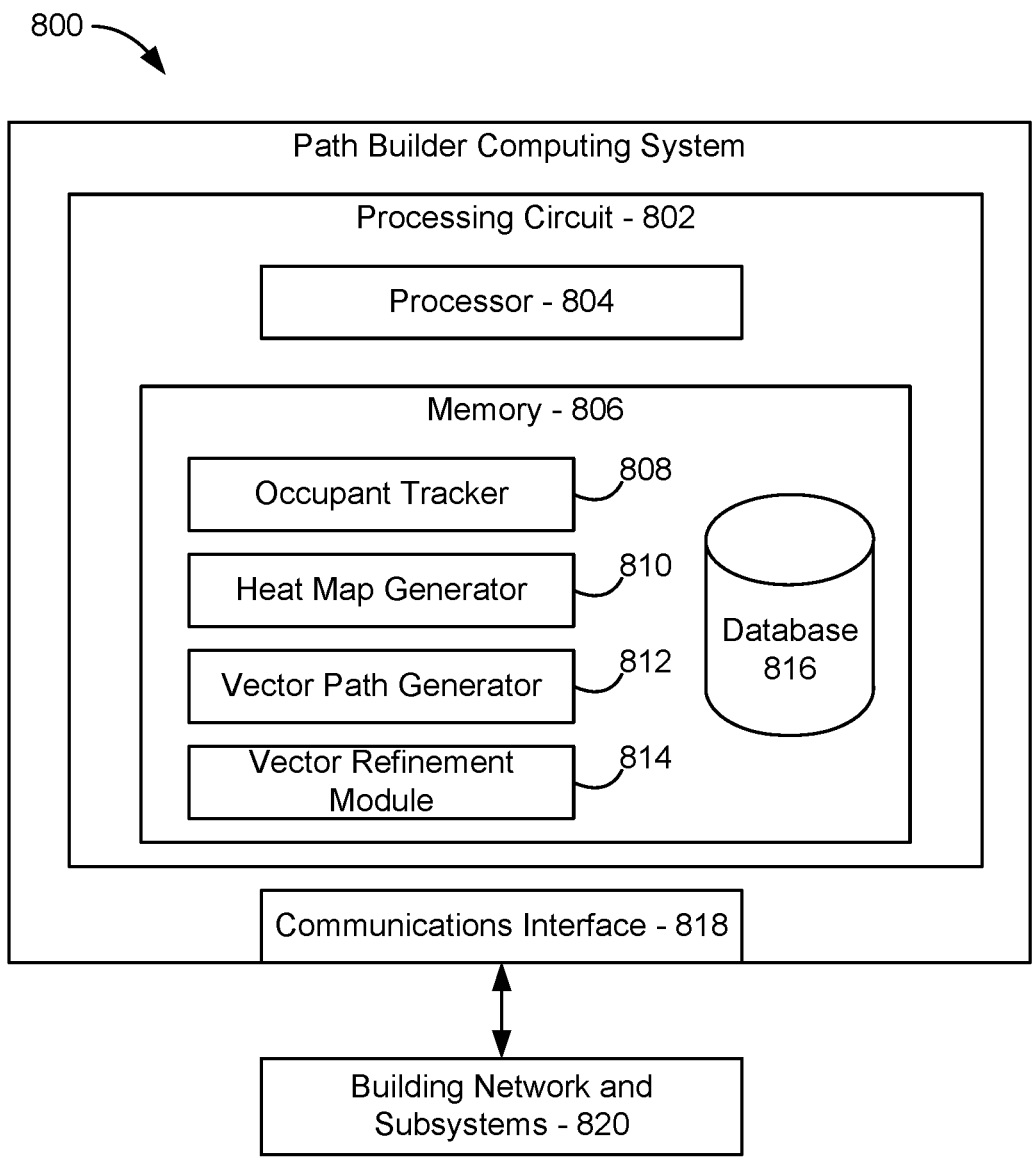
FIG. 8 is a block diagram of a building system that generates occupant paths through a building, according to some embodiments.

Referring to FIG. 8, a block diagram of a building system 800 for building indoor paths is shown. Building system 800 is shown to include a processing circuit 802, the processing circuit 802 comprising a processor 804 and memory 806. Memory 806 comprises instructions stored thereon that, when executed by processor 804, cause the processor 804 to perform a variety of functions as described herein. Memory 806 may include an occupant tracker 808, heatmap generator 810, vector path generator 812, vector refinement module 814, and database 816. Building system 800 may also include a communications interface 818 to connect building system 800 to other computing devices and sensors in a building network and building subsystems 820. The processing circuit 802, processor 804, or memory 806 can be the same as, or similar to, the processing circuit 404, processor 406, or memory 408, respectively, as described with reference to FIG. 4.

Processing circuit 802 can comprise one or more processing circuits that can be communicably connected to communications interface 818 such that processing circuit 802 and the various components thereof can send and receive data via communications interface 818 (e.g., to/from building network and subsystems 820, etc.). Processor 804 can be implemented as one or more general purpose processors, application specific integrated circuits (ASIC), one or more field programmable gate arrays (FPGAs), a group of processing components, or other suitable electronic processing components.

Memory 806 (e.g., memory, memory unit, storage device, etc.) can include one or more devices (e.g., RAM, ROM, Flash memory, hard disk storage, etc.) for storing data or computer code for completing or facilitating the various processes, layers and modules described in the present application. Memory 806 can be or include volatile memory or non-volatile memory. Memory 806 can include database components, object code components, script components, or any other type of information structure for supporting the various activities and information structures described in the present application. According to an example embodiment, memory 806 is communicably connected to processor 804 via processing circuit 802 and includes computer code for executing (e.g., by processing circuit 802 or processor 804) one or more processes described herein. In some embodiments, building system 800 is implemented within a single computer (e.g., one server, one housing, etc.). In various other embodiments, building system 800 can be distributed across multiple servers or computers (e.g., that can exist in distributed locations).

Still referring to FIG. 8, memory 806 is shown to include occupant tracker 808. Occupant tracker 808 may be configured to receive occupant location data from a subsystem 820 of a building, and determine the location of an occupant in the building based on the occupant location data. Occupant tracker 808 may be configured to store occupant location data or occupant coordinate data in database 816. Occupant tracker 808 may be configured to identify the individual associated with the location data, and store the identity of the individual with the occupant location data. Occupant tracker 808 may be configured to identify a timestamp from which the occupant location data was measured, and may be configured to store the time data in association with the location data. In some embodiments, occupant tracker 808 may be configured to use a vector path stored in database 816 to adjust the location of a measured occupant location. In some embodiments, occupant tracker 808 can be configured as a separate computing system communicably coupled to building system 800.

Memory 806 is also shown to include heatmap generator 810. Heatmap generator 810 may be configured to retrieve occupant coordinate data from database 816. Heatmap generator 810 may be configured to generate a heatmap of a building space over a time period using occupant coordinate data from the time period. Heatmap generator 810 may also be configured to update a pre-existing heatmap of a building space based on additionally collected occupant location data, or combine one or more heatmaps of the building space into a single heatmap. Heatmap generator 810 may be configured to store the generated heatmap in database 816. In some embodiments, heatmap generator 810 is configured to send the generated heatmap to vector path generator 812.

Still referring to FIG. 8, memory 806 is shown to include vector path generator 812. Vector path generator 812 may be configured to retrieve a heatmap of a building space stored in database 816. Vector path generator 812 may be configured to generate one or more vector paths through a building space using the heatmap. Vector path generator 812 may be configured to implement an iterative algorithm to generate paths as series of vectors. Vector path generator 812 may also be configured to receive and utilize data from a floorplan of a building space. Vector path generator 812 may be configured to store the vector paths in database 816. Vector paths may be generated and stored as a list of vectors. Vector path generator 812 may be configured to add additional vectors to the list of vectors using updated or additional heatmaps.

Memory 806 is also shown to include vector refinement module 814. Vector refinement module 814 may be generally configured to reduce the complexity of one or more vector paths generated for a building space. Vector refinement module 814 is configured to receive the one or more vector paths or a list of vectors defining the vector path from database 816 or from vector path generator 812. In some embodiments, vector refinement module 814 is configured to remove redundant or outlying vectors in the one or more vector paths. Vector refinement module 814 may be configured to remove redundant vectors from the list of vectors. In some embodiments, vector refinement module 814 is configured to combine the endpoints of neighboring vectors. In some embodiments, vector refinement module 814 is configured to combine similar vectors. In some embodiments, a vector refinement module 814 may be configured to receive and utilize user input to refine the vector paths. Vector refinement module 814 stores the refined one or more vector paths in database 816.

Communications interface 818 can be or include wired or wireless communications interfaces (e.g., jacks, antennas, transmitters, receivers, transceivers, wire terminals, etc.) for conducting data communications with building subsystems 820 or other external systems or devices. In various embodiments, communications via interface 818 can be direct (e.g., local wired or wireless communications) or via a communications network (e.g., a WAN, the Internet, a cellular network, etc.). For example, interface 818 can include an Ethernet card and port for sending and receiving data via an Ethernet-based communications link or network. In another example, interface 818 can include a Wi-Fi transceiver for communicating via a wireless communications network. In another example, interface 818 can include cellular or mobile phone communications transceivers, which could include a transceiver operable for communication in a 5G network. In one embodiment, communications interface 818 is a power line communications interface.

Building network and subsystems 820 may include any of the systems or building networks as discussed herein, such as BMS 400 (e.g., BMS controller 366, building subsystems 428, etc.) or any equipment a BMS system is associated with, such as personal computing devices within or near the building, occupant tracking devices, or security systems. Occupant tracking devices and systems may include, but are not limited to, WiFi, Bluetooth, GPS, UWB, radio, infrared, or other tracking systems. A security system may provide occupant coordinate data by reporting each time an occupant scans an ID badge at a security station or scanner with a known location, each time a door is opened or unlocked, and various other features that may be monitored by the security system.

In addition, the building network and subsystems 820 may be configured to connect a user computing device to the building system 800 to interact with and manipulate vector paths generated by building system 800. For example, a user may be presented an interface of the heatmap or coordinate grid of a building space to indicate an entrance, exit, stairwell, or doorway. A user may also be able to add, edit, or remove vectors in the vector path manually after the vector paths have been generated. The information input by the user may be stored in the database 816 for subsequent use in vector path generation and refinement.

Heat Map Generation

Figure 9:
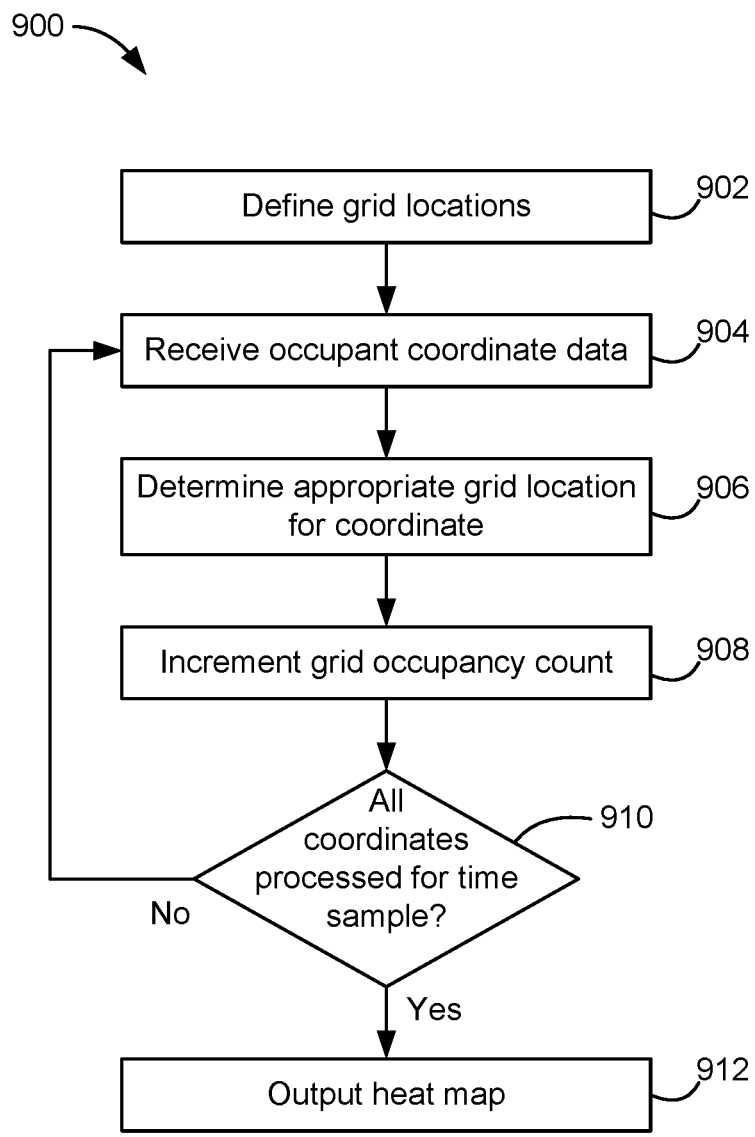
FIG. 9 is a flow diagram of a method for generating a heatmap from occupant coordinate data, according to some embodiments.

Referring now to FIG. 9, a flow diagram of a method 900 for generating a heatmap of a building space from occupant location data is shown. Method 900 may be an embodiment to perform step 602 of FIG. 6. In some embodiments, method 900 may be executed by a processing circuit of building system 800.

Method 900 includes step 902, wherein a grid system is defined for the heatmap. The grid system generally defines values in a matrix, wherein locations in the grid corresponds to locations within a building space. As appreciated with a grid system, values in proximity in the grid system correspond to locations in the building space in proximity to each other. The value at each grid location may be a calculated value based on the occupant traffic in the corresponding location in the building. In some embodiments, each value in the grid system is initialized to zero such that measurement data can be aggregated for each grid location. In some embodiments, the grid system is defined differently than the coordinate system used to track occupants' location or define occupant location data.

At 904, occupant coordinate data is received from an occupant tracking system. Occupant coordinate data may be received by a computing system over a period of time. Occupant coordinate data may be retrieved from a memory storage device. Occupant coordinate data may be received in real time from a building system.

At 906, the received occupant coordinate data is associated with a grid location in the heatmap coordinate grid. In some embodiments, the occupant coordinate data is associated with the closest grid location. In some embodiments, the occupant coordinate data is associated with multiple grid locations.

At 908, the value in the associated grid location is incremented based on the occupant coordinate data. In some embodiments, the value in the grid location is a occupancy count, and each occupant coordinate data sample associated with the grid location increments the value in the grid location by one unit. In embodiments where an occupant coordinate data sample is associated with more than one grid location, the value in each grid location may be incremented. In some such embodiments, the value in each grid location may be incremented by different values based on the proximity of the occupant coordinate data to the respective grid locations.

At 910, a determination is made whether to continue collecting occupant coordinate data to generate the heatmap of the building. In some embodiments, a system is configured to generate a heatmap after a pre-determined number of collected samples. In some embodiments, the occupant coordinate data is incorporated as it is received by the system. In some embodiments, the occupant coordinate data is received by sending a ping signal to an occupant tracking device.

Responsive to the determination at 910 to stop processing occupant coordinate data, the heatmap is output for use at 912. In some embodiments, the values in the heat map are normalized. In some embodiments, the values in the heat map are normalized on a non-linear scale, such as a log-scale. In some embodiments, the heatmap is stored in a storage device for later use. In some embodiments, the heatmap is sent to a processing circuit to generate the vector paths within the building.

In some embodiments, heatmap generation may also include locally averaging or otherwise low-pass filtering the data in the generated heatmap to smooth occupant densities. A low-pass filter may be implemented by averaging or combining the occupant density data for each coordinate grid location with nearby grid locations. Such embodiments may be implemented when a discrete coordinate grid defines relatively small intervals between grid locations to account for error in occupant location data.

Vector Path Generation

Figure 10:
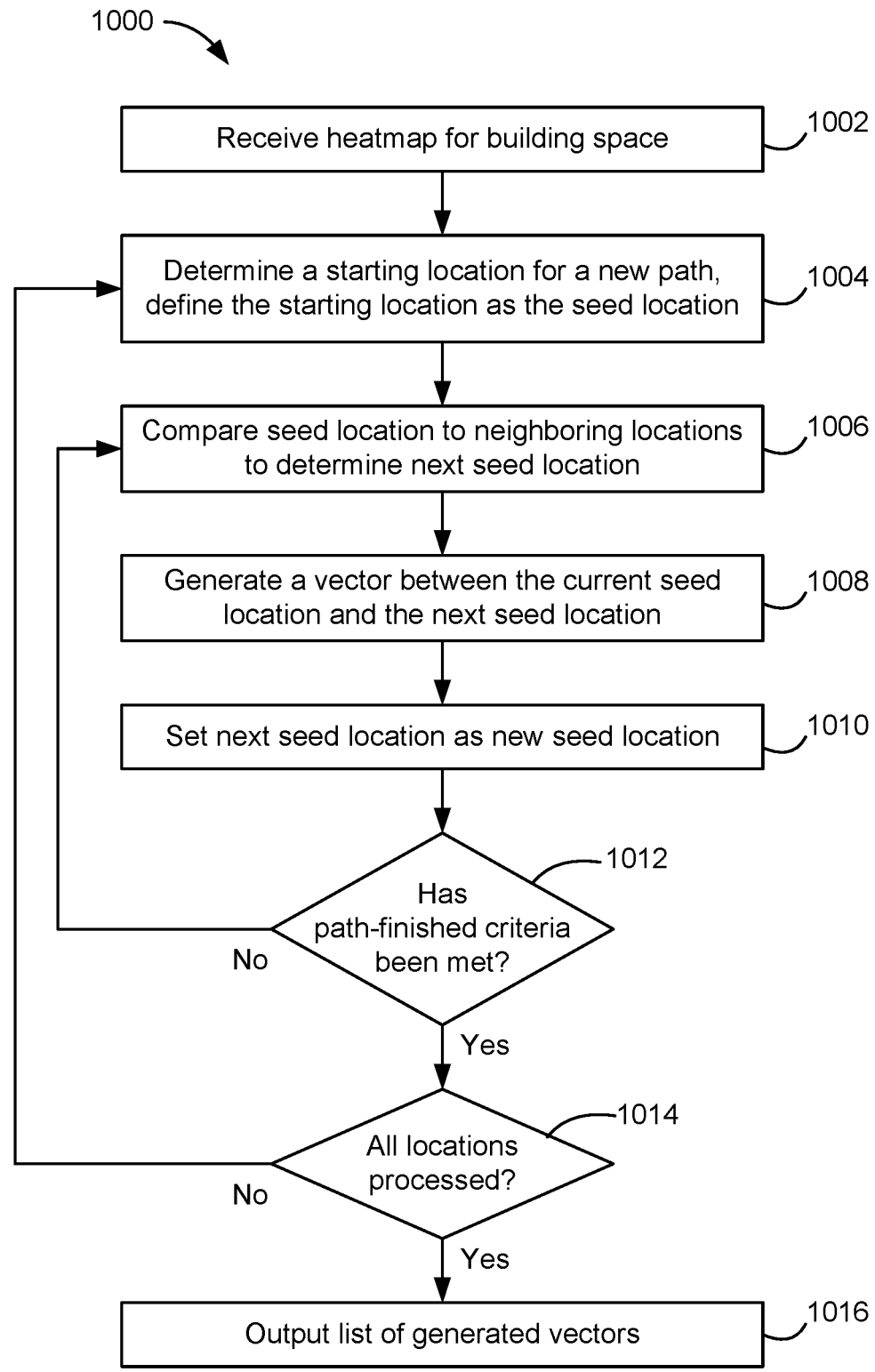
FIG. 10 is a flow diagram of a method for generating vectors using heatmap, according to some embodiments.

Referring now to FIG. 10, a flow diagram of a method 1000 for generating vectors paths through a building using occupant location data is shown. Method 1000 is shown to include receiving a heatmap for a building space at 1002. The heatmap received at 1002 comprises occupant density data at various grid locations corresponding to locations within the building space. The occupant density data is a measure of how many occupant coordinate data samples were measured at a grid location, which may generally represent how often a location in the building is visited or traversed through by occupants.

At 1004, a starting location for a new vector path is determined within a coordinate system of the building. In some embodiments, the starting location is determined randomly from the coordinate locations in the coordinate system not yet considered. In some embodiments, the starting location is determined based on a known building feature, such as an entrance or exit of the building, a stairwell, or a doorway. In some embodiments, the starting location is determined based on the grid location being located on the edge of the coordinate grid. In some embodiments, the starting location is determined based on a maximum value of the values in the eligible grid locations.

The starting location can be defined as the seed location, the seed location being a dynamic pointer or tag that denotes which grid location is the currently considered location in a vector path and that defines one of the coordinate points for the next vector to be generated. The grid location defining the seed location will be updated as vectors are generated in a vector path.

At 1006, the seed location is compared to neighboring grid locations to determine the next seed location. The neighboring grid locations of the seed location can be defined as a subset of grid locations within a radius or threshold distance from the seed location. In some embodiments, the distance is a Euclidean distance. In some embodiments, the distance is measured as a Manhattan distance. Any distance measurement can be used. In some embodiments, the neighboring grid locations are a pre-defined neighborhood or region of the coordinate grid.

The seed location may be compared to each neighboring grid location identified. In some embodiments, the comparison is a similarity measurement based on the occupant density data at the two grid locations. In some embodiments, the comparison is a function of the distance between the two grid locations. In some embodiments, the comparison is based on a time value of the occupant coordinate data associated with the grid locations. The comparison between the seed location and each neighboring location can be a combination of any of the comparison criteria described herein. The next seed location may be determined based on the comparison being a maximum value of all identified neighboring grid locations. For example, the next seed location is determined based on the seed location and the next seed location having the most similar occupant density data than all other neighboring grid locations.

At 1008, a vector is generated between the current seed location and the next seed location. The vector can be defined by the grid locations of the current seed location and the next seed location. In some embodiments, the vector is directional, wherein the current seed location is the start-point and the next seed location is the endpoint. In some embodiments, the vector is bidirectional. The generated vector may be stored in a list of generated vectors.

At 1010, the next seed location is defined as the new seed location. By moving the seed location from one grid location to another, a continuous path may be constructed from the start of the vector path to end of the vector path.

At 1012, a determination is made whether a path-termination criteria has been met for the current vector path. In some embodiments, the path-termination criteria is to terminate the vector path if the new seed location is on the edge of the coordinate grid. In some embodiments, the path-termination criteria is based on the occupant density data stored at the new seed location not exceeding a threshold value. In some embodiments, the path-termination criteria is based on the neighboring grid locations of the next seed location. In some embodiments, the path-termination criteria is based on the next seed location being a previously used seed location. The path-termination criteria can be any combination of the criteria discussed herein.

If the path-termination criteria has not been met at 1012, the method 1000 is repeated at 1006 wherein the next seed location is determined for the vector path. Otherwise, when the path-termination criteria is satisfied, a determination is made at 1014 whether all eligible grid locations have been processed for vector path generation. In some embodiments, grid locations are considered eligible for processing responsive to the grid location having a value greater than zero. In some embodiments, a grid location is considered eligible for vector path processing responsive to no vector path coinciding with the grid location. In some embodiments, all grid locations not previously defined as a seed location are considered eligible for processing.

Responsive to the determination at 1014 being that not all grid locations have been processed, the method 1000 repeats at 1004 to determine a new starting location for another vector path and repeat the subsequent steps. When the determination at 1014 is that all grid locations have been processed, the list of generated vector paths is outputted at 1016. The list of generated vector paths may be stored in a memory or a processing circuit for further refinement. In some embodiments, the vector paths are output as a plurality of generated vectors, wherein the vectors are output and stored independent of an association with a specific vector path. In some embodiments, the vectors are associated with their respective vector path.

Figure 11:
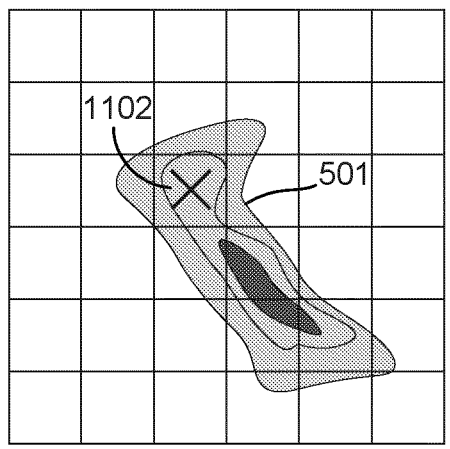
FIG. 11 is a depiction of various steps in generating vectors using a heatmap, according to some embodiments.
Figure 11:
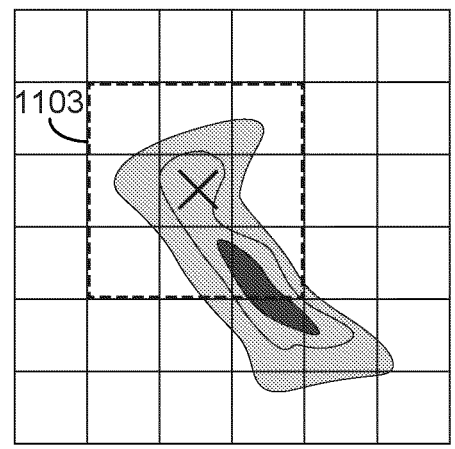
Figure 11:
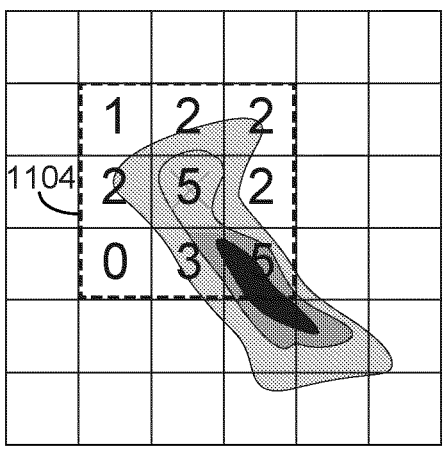
Figure 11:
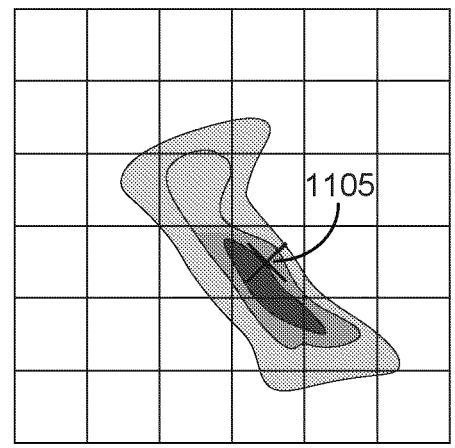
Figure 11:
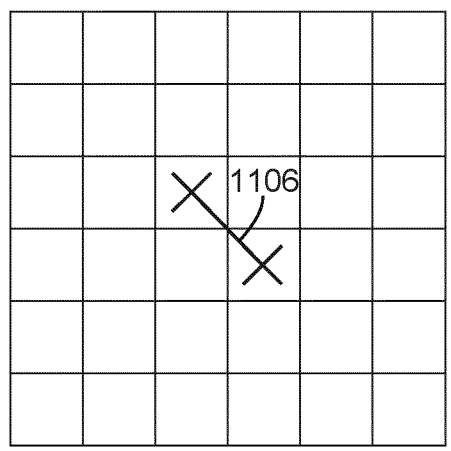

Referring now to FIG. 11, a depiction of various steps of method 1000 is shown, according to an illustrative example. Shown in 1100 is a portion of a coordinate grid with the relative values of the heatmap overlaid thereon. The mark at 1102 denotes the selected starting location as the seed location. A neighborhood of grid locations for seed location 1102 is determined, illustrated as the grid locations with the horizontal hash lines 1103. A comparison is made to determine which grid location will be the next seed location. In this example, a value is generated in each grid location based on the occupant density data of the heatmap in 1104. The value associated with the seed location is compared to the value of each grid location in the identified neighborhood, and the grid location with the most similar value (i.e., closest to the value of the seed location) is chosen as the next seed location 1105. A vector 1106 is generated between the seed location and the next seed location. The algorithm can repeat several times such that a vector path is generated through the building space.

Figure 12:
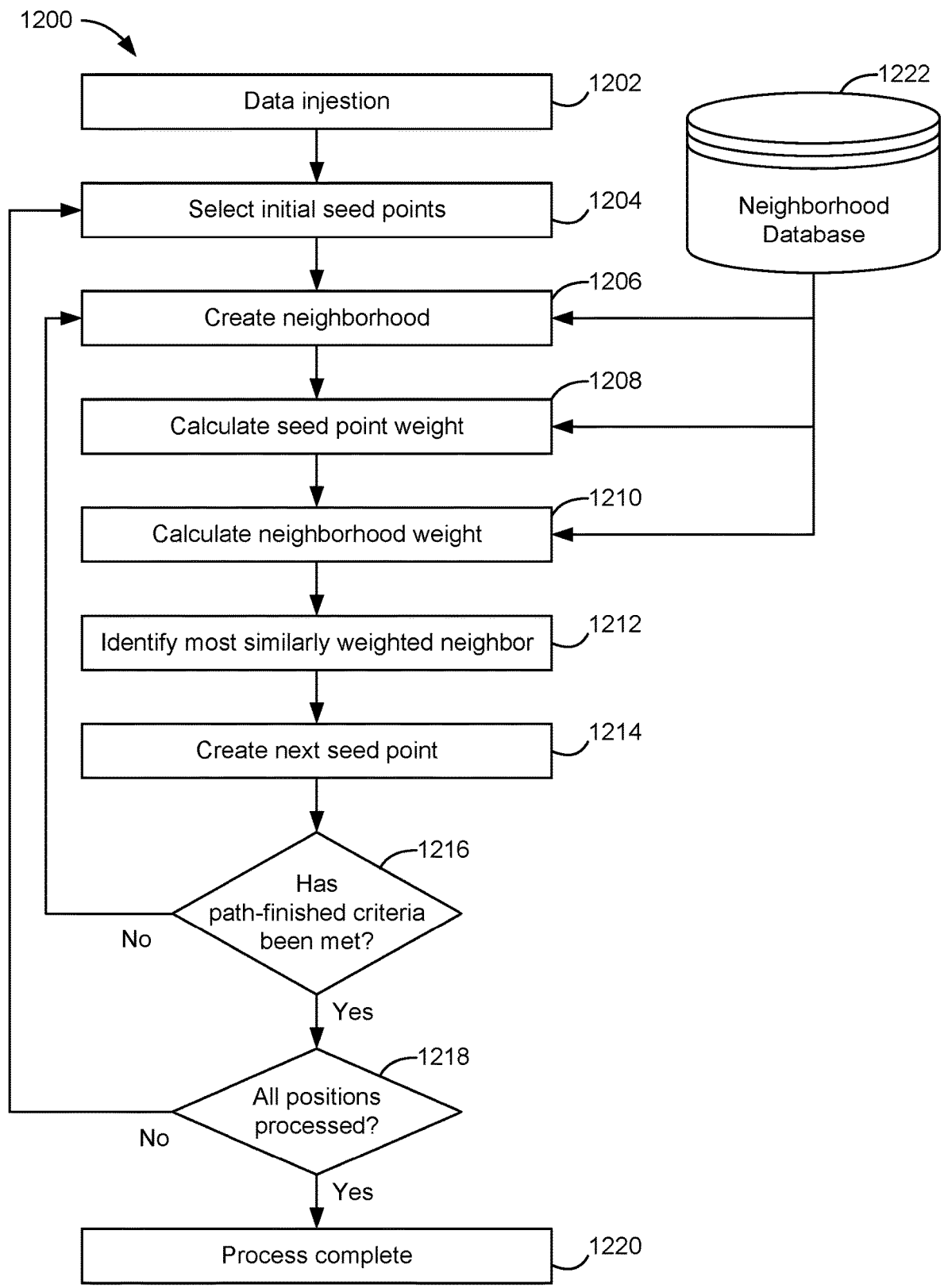
FIG. 12 is another flow diagram of a method for generating path vectors using a heat map, according to some embodiments.

Referring now to FIG. 12, another flow diagram of a method 1200 for generating vector paths is shown, according to some embodiments. Method 1200 generally defines a seed point for referencing a grid location in the heatmap grid. A neighborhood is defined for the seed point, which may be based on data available in the neighborhood database 1222. A new seed point is selected from the grid locations in the defined neighborhood and a vector is generated between the previous seed point and the new seed point. The method 1200 may be repeated until all grid locations have been processed.

At 1202, occupant density data for a building space is received by a processing system. The received data may define a coordinate grid system to be used to define the vector paths. The received data may be configured as a heatmap. The received data may indicate how frequently occupants were measured at a particular location within the building space. The received data may also include identifying information to map neighborhood data in neighborhood database 1222 to grid locations in the received data.

At 1204, an initial seed point is selected. The initial seed point may be chosen based on the grid location being identified as an entrance location in the building space. The initial seed point may be chosen based on having the highest occupant density value of all unprocessed grid locations. The initial seed point may be chosen based on being on the edge of the coordinate grid.

At 1206, a neighborhood is defined based on the seed point. In some embodiments, a neighborhood is defined as all the grid locations within a radius of the seed point. The radius may be measured by Euclidean or Manhattan distance, for example. In some embodiments, the neighborhood is defined based on the magnitude of the coordinate data associated with the seed point. In some embodiments, the neighborhood is defined based on pre-determined regions of the coordinate grid stored in neighborhood database 1222. The pre-determined regions may be based on known walls, spaces, or doorways in a building space.

At 1208, a weight for the seed point is calculated. The weight may be based on the value of the occupant density data associated with the seed point. The weight may be based on the size of the determined neighborhood. The weight may be a function of one or more of the parameters discussed herein. In some embodiments, the weight may be on a quantized scale. At 1210, weights are calculated for the grid locations in the defined neighborhood. The weights for the neighboring grid locations may be calculated in any manner as discussed in relation to the weight for the seed point. In some embodiments, the weights for the neighboring grid locations are calculated in the same manner as the weight for the seed point.

As 1212, the neighbor with the most similar weight to the weight of the seed point is identified based on the calculated weight of the seed point and the neighboring grid locations. The neighboring grid location may be identified as having a weight closest in magnitude to the weight of the seed location. In the event two grid locations are identified as being the most similarly weighted neighbor, a decision function may be used to determine which neighbor to select. In some embodiments, the decision function chooses the grid location in the direction from the seed location in the most similar direction as the previous vector. In some embodiments, the decision function chooses one of the grid locations at random. At 1214, the next seed point is defined as the most similarly weighted neighbor in 1212. A vector may be generated from the previous seed point to the next seed point.

At 1216, a determination is made whether path finish criteria has been met. Path finish criteria may generally determine whether a different seed point should be determined than the next seed point at 1214 so as to form a different chain of vectors. The path finish criteria may be based on whether the next seed point of 1214 is on the edge of the coordinate grid. The path finish criteria may be based on the difference between the weights of the previous seed point and the next seed point in 1212. Responsive to the path finish criteria not being met at 1216, the method 1200 repeats at 1206 to continue analyzing neighboring values to the seed point determined in 1214, and continue creating a chain of vectors.

Responsive to the path finish criteria being met at 1216, a determination whether all grid positions have been processed is made at 1218. The determination at 1218 may be based on whether all grid locations with a non-zero coordinate data value have been defined as a seed location at least once. The determination at 1218 may be based on a determination whether all grid locations have been given a weight value. Responsive to the determination at 1218 indicating that not all positions have been processed, method 1200 is repeated at 1204 to determine an initial position for another vector path. Responsive to the determination of 1218 being met, the method 1200 terminates at 1220.

Vector Path Refinement

Figure 13:
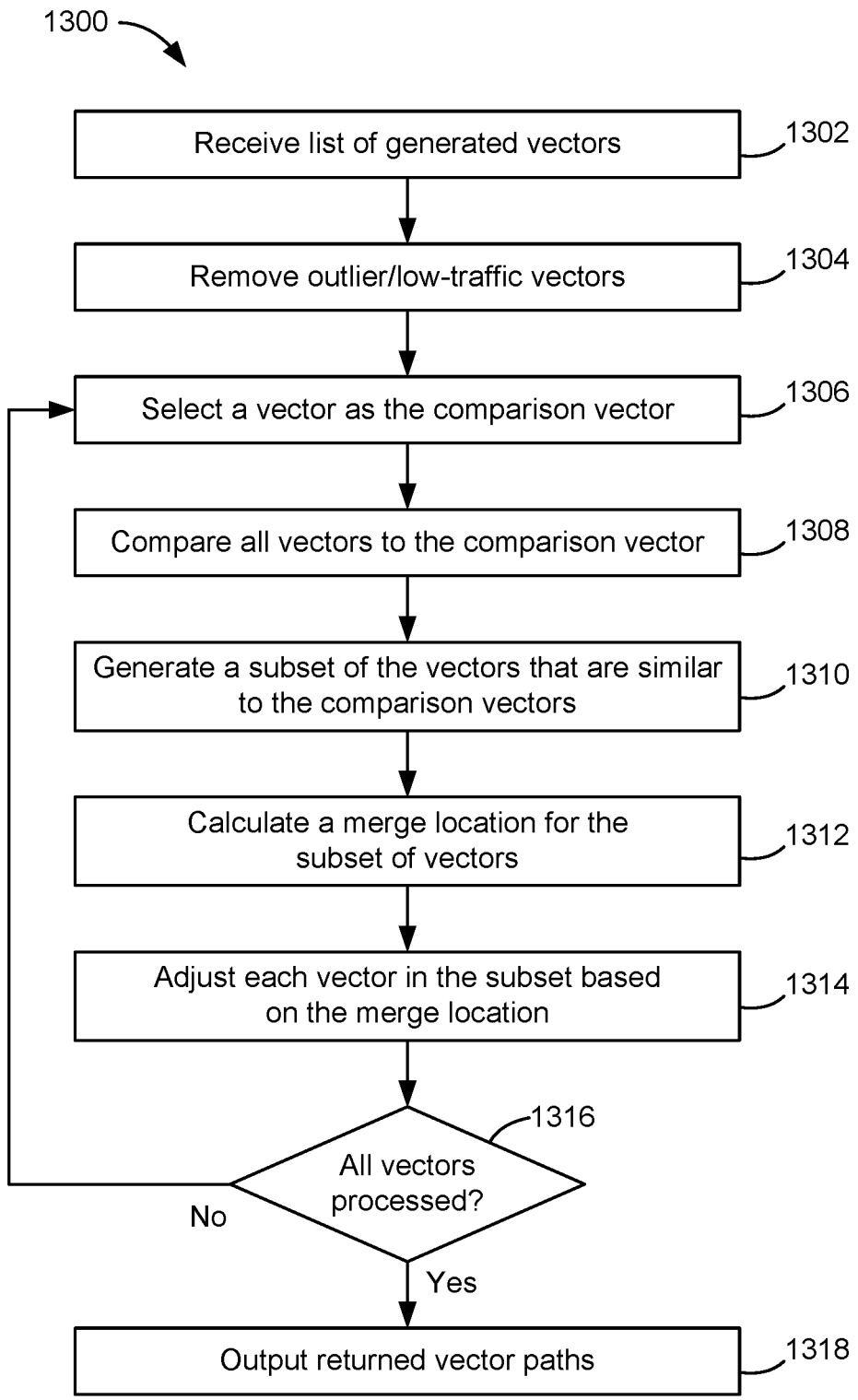
FIG. 13 is a flow diagram of a method for refining a set of vector paths through building, according to some embodiments.

Referring now to FIG. 13, a flow diagram for a method 1300 to reduce the complexity of the one or more vector paths is shown, according to one embodiment. Method 1300 may be performed to execute step 608 of flow diagram 600. Generally, the vector paths generated at step 606 may comprise fringe or outlying vectors, may have overlapping or nearly-identical paths, or may have end points in near proximity but do not coincide. Accordingly, method 1300 can be executed to simplify generated vector paths.

FIG. 13 is shown to include receiving the list of generated vectors at 1302. The list of generated vectors may retrieved from memory or received from a processing circuit. The list of vectors may generally define the vectors by two grid locations in a coordinate grid, and may be directional (i.e., define a startpoint and endpoint for each vector). In some embodiments, the vectors in the list of vectors is associated with a continuous vector path comprising a series of connected vectors. In some embodiments, the vectors in the list of vectors are associated with occupant density data corresponding to the defining grid locations. The list of vectors may be understood to be dynamic in that vectors in the list of vectors can be added, removed, and edited during refinement.

At 1304, outlier vectors are removed from the list of vectors. Various criteria may be used to determine whether a vector is an outlier vector. In some embodiments, a vector is determined an outlier vector if the occupant density data for at least one of the grid locations defining the outlier vector is less than a threshold value. In some embodiments, the vector is determined an outlier vector if the occupant density data for both of the two grid locations used to define the vector are less than the threshold value. In some embodiments, a vector may be identified as an outlier vector if the number of vectors that coincide with the vector is less than a threshold value.

At 1306, a vector from the remaining vectors in the list is selected as the comparison vector. The comparison vector will be used in subsequent steps as a reference vector for refining vectors in proximity to the comparison vector. In some embodiments, the comparison vector is chosen randomly from eligible vectors in the list of vectors. In some embodiments, the comparison vector is chosen based on the vector having the highest value of occupant density data for its defining grid locations. In some embodiments, the comparison vector is chosen based on a coordinate point used to define the most number of vectors in the list of vectors.

At 1308, all remaining vectors in the list of vectors are compared to the comparison vector. The comparison is generally used to determine which vectors to combine or adjust. In some embodiments, the comparison may be based on comparing the defining grid locations between two vectors. In some such embodiments, the comparison is based on the startpoints of the two vectors being within a threshold distance, the endpoints of the two vectors being within a threshold distance, or a combination of the two. The comparison may also be based on occupant coordinate data for the vectors. In some embodiments, the comparison is a similarity measurement of the two vectors, such as a measurement of the angle between the two vectors or an indication of whether the two vectors are exactly or nearly parallel, orthogonal, or intersecting.

At 1310, a subset of the remaining vectors is determined based on the comparison of each vector to the comparison vector in 1308. The subset generally defines vectors to be combined or otherwise adjusted and is understood to include at least the comparison vector. For example, in some embodiments, a vector is added to the subset of vectors when the comparison at 1308 indicates that the endpoints of the vector and the comparison vector are within a threshold distance of each other. As another example, a vector can be added to the subset of vectors responsive to the comparison at 1308 being that at least one of the defining coordinate points of the vector is within a threshold distance of at least one of the defining coordinate points of the comparison vector. In some embodiments, both defining coordinate points must be within a threshold distance of a coordinate point of the comparison vector. In another embodiment, a vector is added to the subset of vectors when the similarity measurement of 1308 is within a threshold value.

At 1312, a merge location is calculated for the subset of vectors. The merge location may represent one or more grid locations that which vectors in the subset of vectors will redefine one or more of their grid locations. In some embodiments, the merge location is the location of the comparison vector. In some embodiments, the merge location is an average vector of the subset of vectors, wherein the average vector comprises two averaged grid locations. In some such embodiments, the startpoints each vector in the subset of vectors are averaged to calculated a startpoint of the average vector, and the endpoints of each vector in the subset of vectors is averaged to calculate an endpoint of the average vector. In some embodiments, the merge location is an average grid location. In some such embodiments, the endpoints of each vector in the subset of vectors are averaged to calculate the average merge point. In other such embodiments, the coordinate point for each vector in the subset of vectors closest to the endpoint of the comparison vector are averaged to calculate the average merge point. The merge location may also be adjusted to the nearest discrete value of a coordinate grid.

At 1314, each vector identified in the subset of vectors is adjusted based on the merge location. The adjustment of vectors in the subset of vectors is also understood to adjust the corresponding vector in the dynamic list of vectors. In embodiments where the merge location is a single merge point, a grid location for each vector in the subset of vectors is adjusted to the merge location. In some such embodiments, the grid location that is adjusted for each vector is the designated endpoint of each vector. In embodiments where the merge location is an average vector, both coordinate points of each vector in the subset of vectors is adjusted to the merge location vector. In some embodiments, vectors from the subset of vectors are removed from the dynamic list of vectors when a vector is redundant of another vector in the subset of vectors.

At 1316, a determination is made whether all eligible vectors have been processed. A vector may be considered eligible if the vector is in the dynamic list of vectors and has not be selected as the comparison vector. In some embodiments, the determination at 1316 is true if all vectors have been considered as the comparison vector without any vector adjustments being made to any vector. In some embodiments, method 1300 maintains a TODO list of vectors to process, which can be dynamically added to during the execution of method 1300, wherein the determination at 1316 is based on whether there are remaining vectors in the TODO list. Responsive to the determination at 1316 that not all vectors have been processed, the method 1300 repeats at 1306 to select a new comparison vector from the remaining eligible vectors. Otherwise, responsive to the determination at 1316 that all vectors have been processed, the remaining vectors are outputted as the refined vector paths at 1318. The refined vectors may be stored in a memory or sent to a processing circuit for subsequent use or manipulation.

Figure 14:
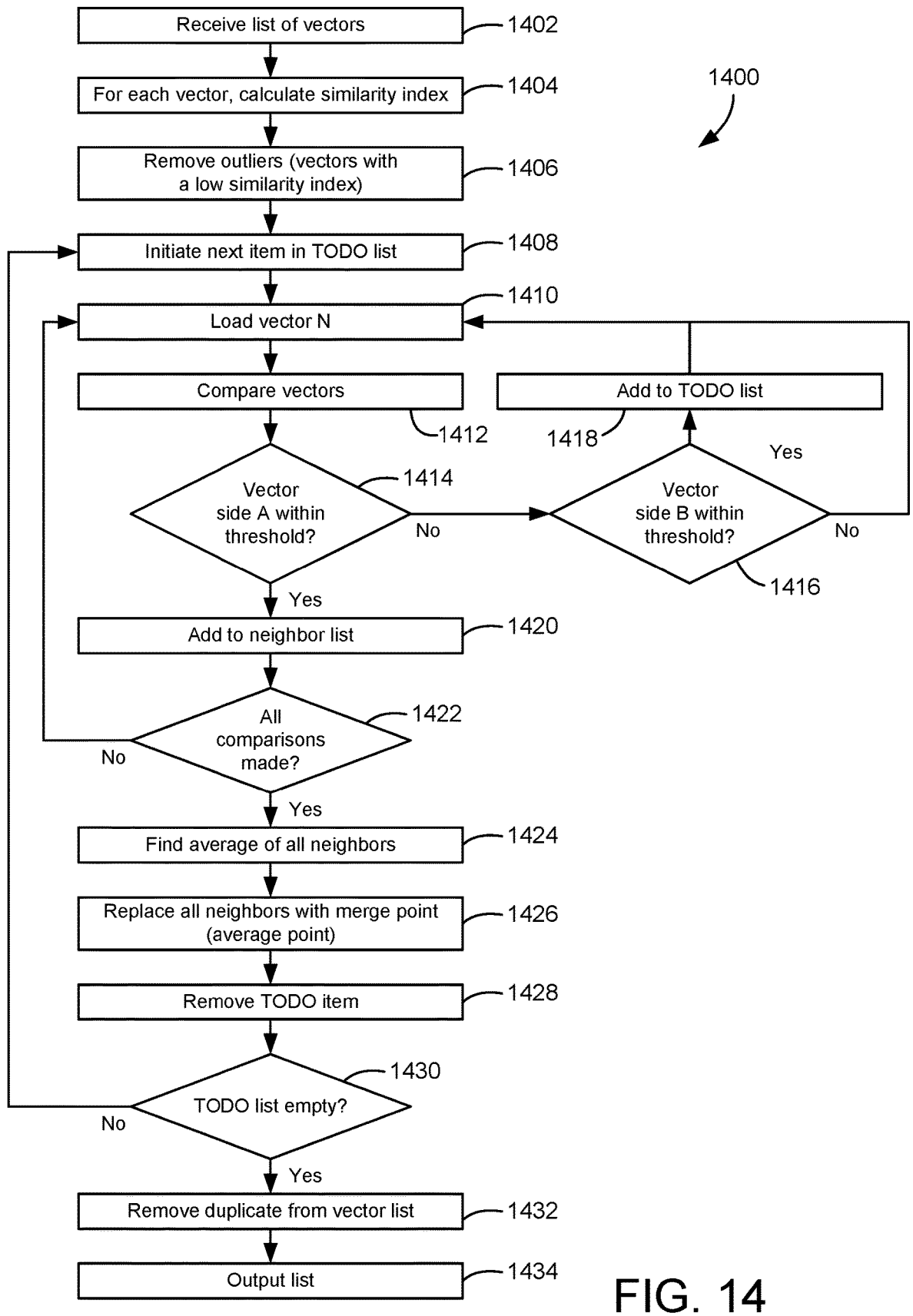
FIG. 14 is another flow diagram of a method for refining a set of vector paths through building, according to some embodiments.

Referring now to FIG. 14, another method 1400 for vector refinement is shown, according to some embodiments. Method 1400 generally receives a set of vectors or and reduces the complexity and redundancy of vector paths in the list of vectors. The list of vectors is generally dynamic wherein vectors can be added and removed from the list of vectors as part of vector refinement. Method 1400 also defines a TODO list of actionable processes to perform. The TODO list may be a first-in-first-out list, a first-in-last-out list, or an unordered list. The TODO list may be used as a means to determine when to conclude vector refinement.

At 1402, a list of vectors is received. The list of vectors generally defines pairs of coordinates in a coordinate grid. The vectors in the list of vectors may be directional, wherein the pair of coordinates designates a startpoint and an endpoint for each vector. The vectors or the coordinate grids defining the vectors may be associated with occupant data or a specific vector path. The list of vectors may be retrieved from a memory or received from a processing circuit.

At 1404, a similarity index is calculated for each of the vectors in the list of vectors. In some embodiments, the similarity index is a measurement of the difference between occupant density data values of the two coordinates defining each vector. In some embodiments, the similarity index is a measure of the number of other vectors in proximity to the vector. Proximity of a neighboring vector may be based on the proximity of one or both of the coordinates defining the neighboring vector, and may be measured in Euclidean or Manhattan distance, for example. In some embodiments, the similarity measurement is a function of one or more of the measurements discussed herein. The similarity index may be on a quantized scale with a finite maximum value.

At 1406, vectors in the list of vectors with a similarity index below a threshold value are removed from the list of vectors. The removal of vectors with similarity indices below the threshold enables the removal of outlying vectors from the list of vectors. The threshold value may be a pre-determined value based on a desired complexity of the vector paths. In some embodiments, the threshold value may be based on the quantized scale of the similarity index. In some embodiments, the threshold value may be dynamically determined based on removing a determined percentage of vectors from the list of vectors. The remaining vectors in the list of vectors are added to the TODO list to be processed.

At 1408, a vector from the TODO list is loaded from the TODO list for processing. This vector may be referenced herein as the base vector. The base vector will be compared to each remaining vector in the list of vectors for similarity. The vector may be chosen randomly, by order, or by any other selection criteria discussed herein.

At 1410, another vector from the list of vectors is selected for comparison. This vector may be referred to herein as the test vector. At 1412, the test vector is compared to the base vector for similarity. The comparison may include a similarity measurement between the two vectors. The comparison may be based on a comparison between the startpoint of the test vector and the startpoint of the base vector, the endpoint of the test vector and the endpoint of the base vector, or any combination thereof. In some embodiments, the comparison is based on the nearest coordinate points of the vectors, regardless of the coordinate points being startpoints or endpoints of the vectors. In some embodiments, the comparison is based on a measurement of the vectors themselves rather than the coordinate points, such as a measurement of whether the vectors are parallel, orthogonal, or intersecting. The comparison may be an aggregate function of any of the measurements discussed herein.

At 1414, a determination is made whether the test vector has a coordinate point within a threshold value of a coordinate point of the base vector. The determination at 1414 may be based on the endpoints of the vectors being within a threshold distance. The distance may be calculated as Euclidean or Manhattan distance, for example. The threshold value may be a pre-determined value based on the degree to which the vectors should be refined.

Responsive to the determination that the coordinate points are not within the threshold value, a second determination may be made at 1416 to determine whether the other coordinate points not considered in the determination at 1414 are within a threshold distance. In embodiments where the determination at 1414 is based on the endpoints of the vectors, the determination at 1416 may be based on the startpoints of the vectors not being within a threshold distance. The threshold value of determination 1416 may be the same or different than the threshold value of determination 1414. Responsive to the determination at 1416 indicating the other coordinate points are not within a threshold value, the test vector is not a determined neighbor to the base vector, and the method 1400 may be repeated at 1410 to load the next test vector from the list of vectors. Responsive to the determination at 1416 that the second set of coordinates is within a threshold value, the test vector may be added to the TODO list at 1418 for later processing.

Responsive to the determination at 1414 that the first set coordinate points are within the threshold value, the test vector is added to a list of neighboring vectors for the base vector at 1420. The list of neighboring vectors defines the vectors that will be combined with the base vector, and is generally understood to also comprise the base vector. At 1422, a determination is made whether all vectors in the list of vectors has been tested against the base vector. Responsive to the determination at 1422 that not all vectors in the list of vectors has been compared to the base vector, the method 1400 is repeated at 1410 to load the next vector as the test vector to compare to the base vector and repeat the steps 1412-1422.

Responsive to the determination at 1422 that all vectors have been compared to the base vector, an average location is determined at 1424. In some embodiments, the average location is an average vector location. The average location of the vector may be based on averaging all startpoints of the vectors in the list of neighboring vectors and averaging all the endpoints of the vectors in the list of neighboring vectors. In some embodiments, the average location calculated at 1424 is a single coordinate location. The single coordinate location may be a coordinate point of the base vector, or an averaged location calculated based on the base vector and the neighboring vectors. In some embodiments, the average location may be the average of each of the endpoints in the list of neighboring vectors. The average calculation may be a weighted average based on the occupant data associated with each vector or pair of coordinates in the list of neighboring vectors. The average location may be adjusted to the nearest coordinate location defined in the coordinate grid system.

At 1426, each vector in the list of neighboring vectors is adjusted based on the average location determined in 1424. In some embodiments, one of the coordinate points of each vector in the list of neighboring vectors is adjusted to the average location. In some embodiments, the endpoints of each vector in the list of neighboring vectors and the endpoint of the base vector are adjusted to the average location. In some embodiments, a coordinate point of each vector in the list of neighboring vectors is adjusted to a point on the average vector. In some embodiments, the average vector determined in 1424 is added to the list of remaining vectors, and each vector in the list of neighboring vectors is removed from the list of remaining vectors.

At 1428, the base vector is removed from the TODO list. At 1430, a determination is made whether all TODO items have been processed. Responsive to the determination being made that not all TODO items have been processed, a next item in the TODO list is selected at 1408 and the method repeats. Responsive to the determination at 1430 being that all TODO items have been processes, the method 1400 enters step 1432.

At 1432, any duplicate vectors in the list of remaining vectors is removed. Duplicate vectors may be identified by having the same defining coordinate locations. In some embodiments, duplicate vectors may be more strictly defined as vectors having the same startpoints and the same endpoints. Duplicate vectors may be the result of vector path generation or the result of the steps of vector refinement, for example.

At 1434, the final list of vectors that define the refined vector paths are output to a system to be used. The final list of vectors is the list of remaining vectors as adjusted by the vector refinement method 1400. Any of the steps, configurations, or features of method 1400 may be implemented as part of method 1300.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

The term "client or "server" include all kinds of apparatus, devices, and machines for processing data, including by way of example a programmable processor, a computer, a system on a chip, or multiple ones, or combinations, of the foregoing. The apparatus may include special purpose logic circuitry, e.g., a field programmable gate array (FPGA) or an application specific integrated circuit (ASIC). The apparatus may also include, in addition to hardware, code that creates an execution environment for the computer program in question (e.g., code that constitutes processor firmware, a protocol stack, a database management system, an operating system, a cross-platform runtime environment, a virtual machine, or a combination of one or more of them). The apparatus and execution environment may realize various different computing model infrastructures, such as web services, distributed computing and grid computing infrastructures.

The systems and methods of the present disclosure may be completed by any computer program. A computer program (also known as a program, software, software application, script, or code) may be written in any form of programming language, including compiled or interpreted languages, declarative or procedural languages, and it may be deployed in any form, including as a stand-alone program or as a module, component, subroutine, object, or other unit suitable for use in a computing environment. A computer program may, but need not, correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform actions by operating on input data and generating output. The processes and logic flows may also be performed by, and apparatus may also be implemented as, special purpose logic circuitry (e.g., an FPGA or an ASIC).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data (e.g., magnetic, magneto-optical disks, or optical disks). However, a computer need not have such devices. Moreover, a computer may be embedded in another device (e.g., a mobile telephone, a personal digital assistant (PDA), a mobile audio or video player, a game console, a Global Positioning System (GPS) receiver, or a portable storage device (e.g., a universal serial bus (USB) flash drive), etc.). Devices suitable for storing computer program instructions and data include all forms of non-volatile memory, media and memory devices, including by way of example semiconductor memory devices (e.g., EPROM, EEPROM, and flash memory devices; magnetic disks, e.g., internal hard disks or removable disks; magneto-optical disks; and CD ROM and DVD-ROM disks). The processor and the memory may be supplemented by, or incorporated in, special purpose logic circuitry.

To provide for interaction with a user, implementations of the subject matter described in this specification may be implemented on a computer having a display device (e.g., a CRT (cathode ray tube), LCD (liquid crystal display), OLED (organic light emitting diode), TFT (thin-film transistor), or other flexible configuration, or any other monitor for displaying information to the user and a keyboard, a pointing device, e.g., a mouse, trackball, etc., or a touch screen, touch pad, etc.) by which the user may provide input to the computer. Other kinds of devices may be used to provide for interaction with a user as well; for example, feedback provided to the user may be any form of sensory feedback (e.g., visual feedback, auditory feedback, or tactile feedback), and input from the user may be received in any form, including acoustic, speech, or tactile input. In addition, a computer may interact with a user by sending documents to and receiving documents from a device that is used by the user; for example, by sending web pages to a web browser on a user's client device in response to requests received from the web browser.

Implementations of the subject matter described in this disclosure may be implemented in a computing system that includes a back-end component (e.g., as a data server), or that includes a middleware component (e.g., an application server), or that includes a front end component (e.g., a client computer) having a graphical user interface or a web browser through which a user may interact with an implementation of the subject matter described in this disclosure, or any combination of one or more such back end, middleware, or front end components. The components of the system may be interconnected by any form or medium of digital data communication (e.g., a communication network). Examples of communication networks include a LAN and a WAN, an inter-network (e.g., the Internet), and peer-to-peer networks (e.g., ad hoc peer-to-peer networks).

The present disclosure may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, descriptions thereof may not be repeated. Further, features or aspects within each example embodiment should typically be considered as available for other similar features or aspects in other example embodiments.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

The terminology used herein is for the purpose of describing particular embodiments and is not intended to be limiting of the present disclosure. As used herein, the singular forms "a" and "an" are intended to include the plural forms as well, unless the context clearly indicates otherwise. It will be further understood that the terms "comprises," "comprising," "includes," and "including," "has," "have," and "having," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively. Also, the term "exemplary" is intended to refer to an example or illustration.

What is claimed is:

1. A method for generating paths in a building space, the method comprising:
    retrieving, by a processing circuit, a heatmap for the building space, the heatmap comprising a plurality of grid locations, wherein the plurality of grid locations correspond to locations in the building space and comprise occupant density data of the locations in the building space;
    generating, by the processing circuit, a plurality of vectors, the plurality of vectors defined by a first grid location and a second grid location of the plurality of grid locations, wherein generating the plurality of vectors comprises comparing occupant density data for the first grid location to occupant density data for the second grid location;
    determining, by the processing circuit, a subset of vectors from the plurality of vectors based on a proximity of the plurality of vectors to a selected vector of the plurality of vectors;
    combining, by the processing circuit, the subset of vectors to generate a merge location, wherein the merge location is used to adjust at least one of the first grid location or the second grid location of at least one vector in the subset of vectors; and
    at least one of controlling building equipment that serve the building space or providing navigation directions to a user device based on a path generated from at least one vector of the subset of vectors.

2. The method of claim 1, wherein a distance between the first grid location and the second grid location for vectors in the plurality of vectors is within a threshold value.

3. The method of claim 1, wherein generating, by the processing circuit, the plurality of vectors comprises comparing at least one of timestamp data, occupant identity data, or a calculated proximity between the first grid location and the second grid location to generate vectors in the plurality of vectors.

4. The method of claim 1, further comprising removing, by the processing circuit, a vector from the plurality of vectors based on the proximity of the vector to the plurality of vectors or based on the occupant density data of the first grid location or the second grid location of the vector being less than a threshold value.

5. The method of claim 1, wherein the merge location is an average grid location of the first grid location or the second grid location of two or more vectors in the subset of vectors.

6. The method of claim 5, further comprising adjusting, by the processing circuit, the first grid location or the second grid location of the at least one vector in the subset of vectors to the merge location.

7. The method of claim 1, wherein determining, by the processing circuit, the subset of vectors is based on a comparison of at least one of the first grid location or the second grid location of the selected vector to at least one of the first grid location or the second grid location of vectors in the plurality of vectors.

8. The method of claim 7, wherein determining, by the processing circuit, the subset of vectors further comprises including a vector of the plurality of vectors in the subset of vectors responsive to a calculated distance between at least one of the first grid location or the second grid location of the vector and one of the first grid location or the second grid location of the selected vector being less than a threshold value.

9. The method of claim 1, wherein generating, by the processing circuit, vectors in the plurality of vectors further comprises:
    selecting, from the plurality of grid locations, the first grid location for a vector;
    comparing the occupant density data of the first grid location to occupant density data of a subset of grid locations within a threshold distance of the first grid location; and
    selecting the second grid location from the subset of grid locations based on the comparing of the occupant density data of the first grid location to the occupant density data of the second grid location.

10. The method of claim 9, wherein the second grid location of a first generated vector is selected as the first grid location of a second generated vector responsive to the first generated vector failing to meet a criteria to terminate a vector path.

11. The method of claim 10, wherein the criteria to terminate the vector path is based on the second grid location of the first generated vector being an edge grid location of the heatmap.

12. A building system of a building including one or more memory devices storing instructions thereon that, when executed by one or more processors, cause the one or more processors to:
    retrieve a heatmap for a building space, the heatmap comprising a plurality of grid locations, wherein the plurality of grid locations correspond to locations in the building space and comprise occupant density data of the locations in the building space;
    generate a plurality of vectors, the plurality of vectors defined by a first grid location and a second grid location of the plurality of grid locations, wherein generating the plurality of vectors comprises comparing occupant density data for the first grid location to occupant density data for the second grid location;

determine a subset of vectors from the plurality of vectors based on a proximity of the plurality of vectors to a selected vector of the plurality of vectors;

combine the subset of vectors to generate a merge location, wherein the merge location is used to adjust at least one of the first grid location or the second grid location of at least one vector in the subset of vectors; and at least one of control building equipment that serve the building space or provide navigation directions to a user device based on a path generated from at least one vector of the subset of vectors.

13. The building system of claim 12, wherein a distance between the first grid location and the second grid location for vectors in the plurality of vectors is within a threshold value.

14. The building system of claim 12, wherein the instructions cause the one or more processors to generate the plurality of vectors comprises comparing at least one of timestamp data, occupant identity data, or a calculated proximity between the first grid location and the second grid location to generate vectors in the plurality of vectors.

15. The building system of claim 12, wherein the instructions cause the one or more processors to remove a vector from the plurality of vectors based on the proximity of the vector to the plurality of vectors or based on the occupant density data of the first grid location or the second grid location of the vector being less than a threshold value.

16. The building system of claim 12, wherein the instructions cause the one or more processors to determine the subset of vectors is based on a comparison of at least one of the first grid location or the second grid location of the selected vector to at least one of the first grid location or the second grid location of vectors in the plurality of vectors.

17. The building system of claim 12, wherein the instructions cause the one or more processors to generate vectors in the plurality of vectors further by:

selecting, from the plurality of grid locations, the first grid location for a vector;

comparing the occupant density data of the first grid location to occupant density data of a subset of grid locations within a threshold distance of the first grid location; and selecting the second grid location from the subset of grid locations based on the comparing of the occupant density data of the first grid location to the occupant density data of the second grid location.

18. The building system of claim 12, wherein the merge location is an average grid location of the first grid location or the second grid location of two or more vectors in the subset of vectors.

19. The building system of claim 18, wherein the instructions cause the one or more processors to adjust the first grid location or the second grid location of the at least one vector in the subset of vectors to the merge location.

20. One or more memory devices storing instructions thereon that, when executed by one or more processors, cause the one or more processors to:

retrieve a heatmap for a building space, the heatmap comprising a plurality of grid locations, wherein the plurality of grid locations correspond to locations in the building space and comprise occupant density data of the locations in the building space;

generate a plurality of vectors, the plurality of vectors defined by a first grid location and a second grid location of the plurality of grid locations, wherein generating the plurality of vectors comprises comparing the occupant density data for the first grid location to the occupant density data for the second grid location;

determine a subset of vectors from the plurality of vectors based on a proximity of the plurality of vectors to a selected vector of the plurality of vectors;

combine the subset of vectors to generate a merge location, wherein the merge location is used to adjust at least one of the first grid location or the second grid location of at least one vector in the subset of vectors; and at least one of control a building equipment that serves the building space or provide navigation directions to a user device based on a path generated from at least one vector of the subset of vectors.

* * * * *